(12) United States Patent
Zhou et al.

(10) Patent No.: US 9,392,627 B2
(45) Date of Patent: Jul. 12, 2016

(54) METHOD AND APPARATUS FOR PHYSICAL CELL IDENTIFIER COLLISION DETECTION AND NEIGHBORING CELL LIST CONSTRUCTION

(71) Applicant: QUALCOMM INCORPORATED, San Diego, CA (US)

(72) Inventors: Yan Zhou, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 13/794,313

(22) Filed: Mar. 11, 2013

(65) Prior Publication Data

US 2014/0071891 A1 Mar. 13, 2014

Related U.S. Application Data

(60) Provisional application No. 61/700,825, filed on Sep. 13, 2012.

(51) Int. Cl.

| | |
|---|---|
| H04J 11/00 | (2006.01) |
| H04W 76/02 | (2009.01) |
| H04B 1/7083 | (2011.01) |
| H04L 29/12 | (2006.01) |
| H04W 8/26 | (2009.01) |
| H04W 24/02 | (2009.01) |

(Continued)

(52) U.S. Cl.
CPC ........... *H04W 76/021* (2013.01); *H04B 1/7083* (2013.01); *H04J 11/0069* (2013.01); *H04L 61/2038* (2013.01); *H04L 61/2046* (2013.01); *H04W 8/26* (2013.01); *H04W 24/02* (2013.01); *H04W 48/12* (2013.01); *H04W 88/10* (2013.01)

(58) Field of Classification Search
None
See application file for complete search history.

(56) References Cited

U.S. PATENT DOCUMENTS

| | | |
|---|---|---|
| 2009/0047956 A1 | 2/2009 | Moe et al. |
| 2010/0008235 A1 | 1/2010 | Tinnakornsrisuphap et al. |

(Continued)

FOREIGN PATENT DOCUMENTS

| | | |
|---|---|---|
| EP | 2249609 A1 | 11/2010 |
| WO | 2008157573 A1 | 12/2008 |

(Continued)

OTHER PUBLICATIONS

International Search Report and Written Opinion—PCT/US2013/059813—ISAEPO—Mar. 25, 2014.

*Primary Examiner* — Adnan Baig
(74) *Attorney, Agent, or Firm* — Fariba Yadegar-Bandari

(57) ABSTRACT

System, apparatus, and methods are provided for preventing the collision of physical cell identifiers. A network entity broadcasts via a first radio technology a physical cell identifier of a second radio technology, where the first and second radio technologies are co-located in the network entity. The network entity receives from a neighboring network entity another physical cell identifier of the second radio technology used by the neighboring network entity, where the neighboring network entity broadcasts the another physical cell identifier via the first radio technology, and where the first and second radio technologies are co-located in the neighboring network entity. The network entity changes the physical cell identifier, in response to the physical cell identifier being the same as the another physical cell identifier.

18 Claims, 17 Drawing Sheets

(51) Int. Cl.
*H04W 48/12* (2009.01)
*H04W 88/10* (2009.01)

(56) References Cited

U.S. PATENT DOCUMENTS

| | | |
|---|---|---|
| 2010/0039992 A1 | 2/2010 | Prakash et al. |
| 2011/0274012 A1* | 11/2011 | Jang et al. ............... 370/259 |
| 2011/0274097 A1 | 11/2011 | Zhang et al. |
| 2012/0064930 A1 | 3/2012 | Kronander et al. |
| 2013/0017776 A1 | 1/2013 | Takano et al. |
| 2013/0095789 A1* | 4/2013 | Keevill ............ H04W 12/06 455/411 |
| 2015/0038144 A1* | 2/2015 | Ahlstrom ............ H04W 24/02 455/436 |

FOREIGN PATENT DOCUMENTS

| | | | |
|---|---|---|---|
| WO | 2009022974 A1 | 2/2009 | |
| WO | 2010006298 A1 | 1/2010 | |
| WO | WO 2010006298 A1 * | 1/2010 | ........ H04L 29/12264 |
| WO | 2010081855 A1 | 7/2010 | |
| WO | 2011019976 A1 | 2/2011 | |
| WO | WO 2011019976 A1 * | 2/2011 | |
| WO | 2012064248 A1 | 5/2012 | |

* cited by examiner

METHOD AND APPARATUS FOR PHYSICAL CELL IDENTIFIER COLLISION DETECTION AND NEIGHBORING CELL LIST CONSTRUCTION

CLAIM OF PRIORITY UNDER 35 U.S.C. §119

This application claims the benefit of U.S. Provisional Application Ser. No. 61/700,825, entitled "METHOD AND APPARATUS FOR PHYSICAL CELL IDENTIFIER COLLISION DETECTION AND NEIGHBORING CELL LIST CONSTRUCTION" and filed on Sep. 13, 2012, which is assigned to the assignee hereof and expressly incorporated by reference herein in its entirety.

BACKGROUND

I. Field

The present disclosure relates to communication systems and to techniques for preventing the collision of physical cell identifiers (e.g., primary scrambling codes).

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home node B (HNB), home e-node B (HeNB), access point base station, etc. A femtocell may be referred to as a small cell herein.

As more small-coverage base stations are utilized to deploy more small cells, situations may arise where two or more neighboring small cells may have the same physical cell identifiers (e.g., primary scrambling codes), resulting in the collision of such physical cell identifiers. Accordingly, there is a need for a technique to detect and prevent such collisions, particularly in the context of densely deployed small cells.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a method for preventing the collision of physical cell identifiers. In one embodiment, a network entity broadcasts via a first radio technology a physical cell identifier of a second radio technology, where the first and second radio technologies are co-located in the network entity.

In accordance with a related embodiment, a network entity stores (a) a unique global cell identifier of a first radio technology used by the network entity and (b) a physical cell identifier of a second radio technology used by the network entity, where the first and second radio technologies are co-located in the network entity. The network entity serves a mobile entity and sends the unique global cell identifier to the mobile entity.

In accordance with a further related embodiment, a network entity receives a connection request from a mobile entity being served by a neighboring network entity, the connection request comprising a unique global cell identifier of a first radio technology for the neighboring network entity. The network entity sends a physical cell identifier of a second radio technology for the network entity, to the neighboring network entity based on the unique global cell identifier.

In accordance with a further related embodiment, a network entity broadcasts, via a first radio technology, (a) a physical cell identifier of a second radio technology and (b) a unique global cell identifier of the second radio technology, where the first and second radio technologies are co-located in the network entity.

DETAILED DESCRIPTION

Techniques for interference management in a wireless communication system are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM 0, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink (DL) and SC-FDMA on the uplink (UL). UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are explained in the exemplary context of 3GPP networks, and more particularly in the context of the interference management for such networks. The word "exemplary" is used herein to mean "serving as an example, instance, or illustration." Any embodiment described herein as "exemplary" is not necessarily to be construed as preferred or advantageous over other embodiments.

Figure 1:
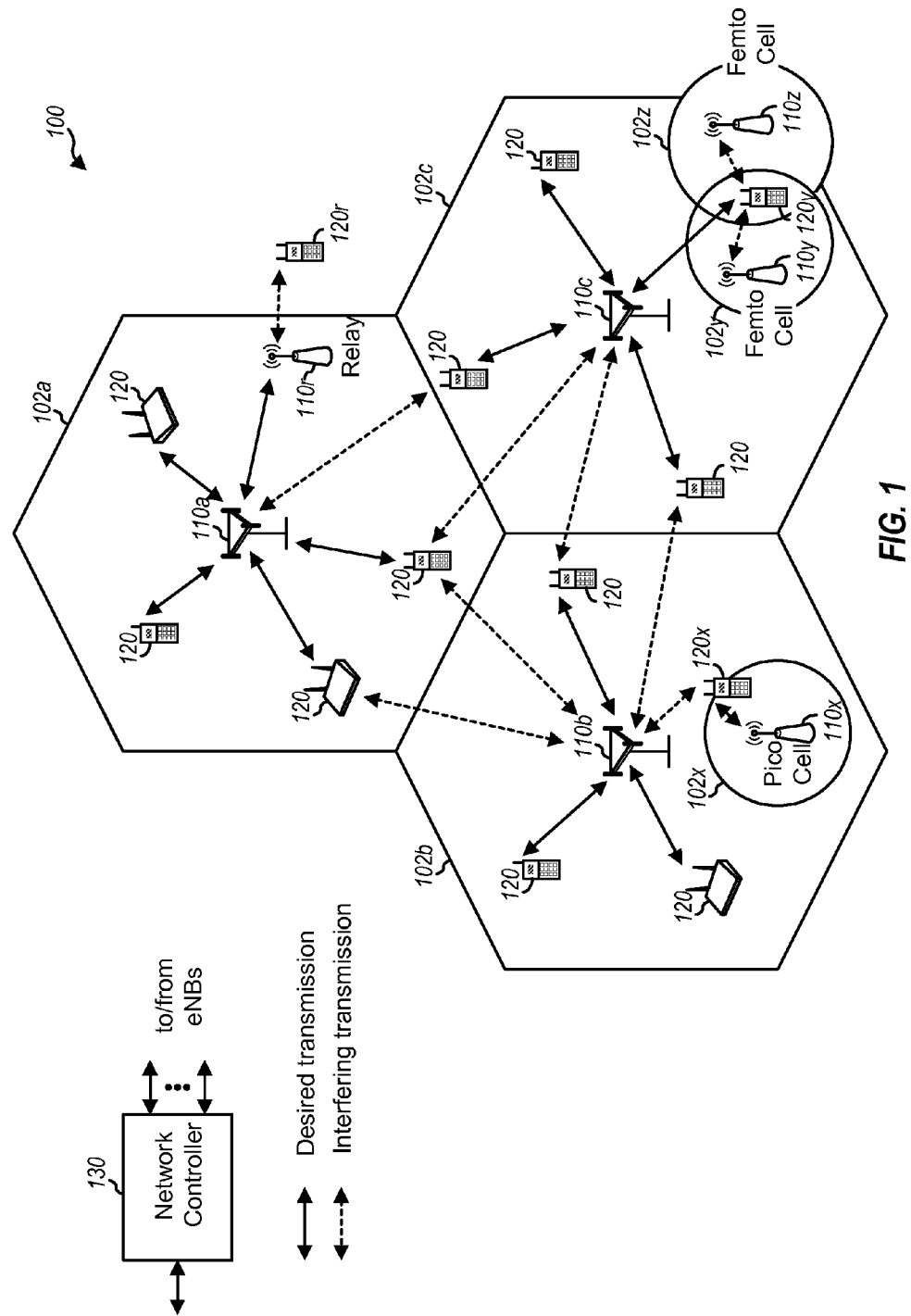
FIG. 1 is a block diagram conceptually illustrating an example of a telecommunications system.

FIG. 1 shows a wireless communication network 10, which may be an LTE network or some other wireless network (e.g., a 3G network or the like). Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a picocell, a femtocell, and/or other types of cell. A macro cell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG), or closed access). In the example shown in FIG. 1, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a picocell 20d. An eNB 30e may be a femto eNB or femto access point (FAP) for a femtocell 20e.

Wireless network 10 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may include a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the DL and UL. A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the given DL carrier.

Wireless network 10 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods.

Figure 2:
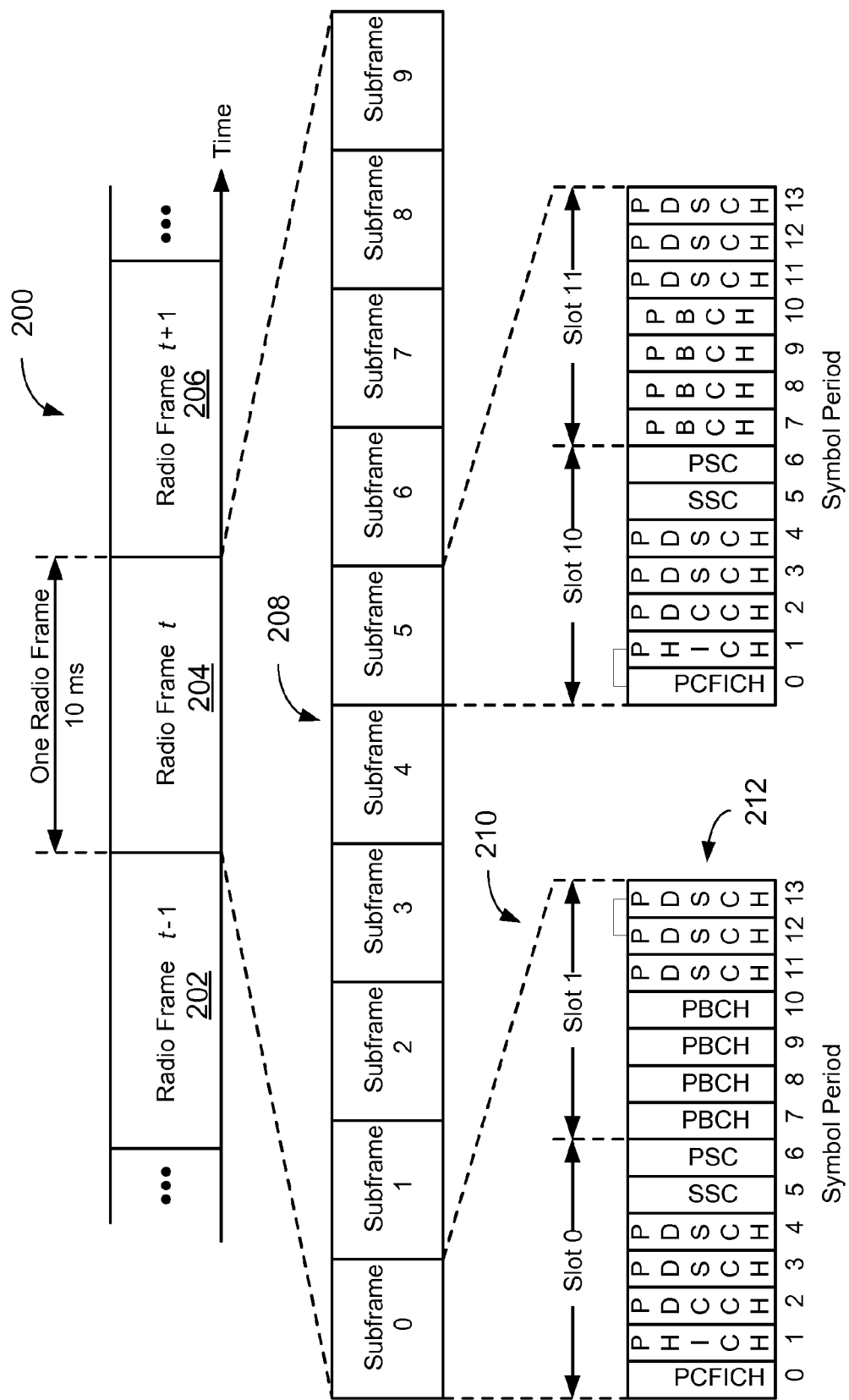
FIG. 2 is a block diagram conceptually illustrating an example of a down link frame structure in a telecommunications system.
Figure 6:
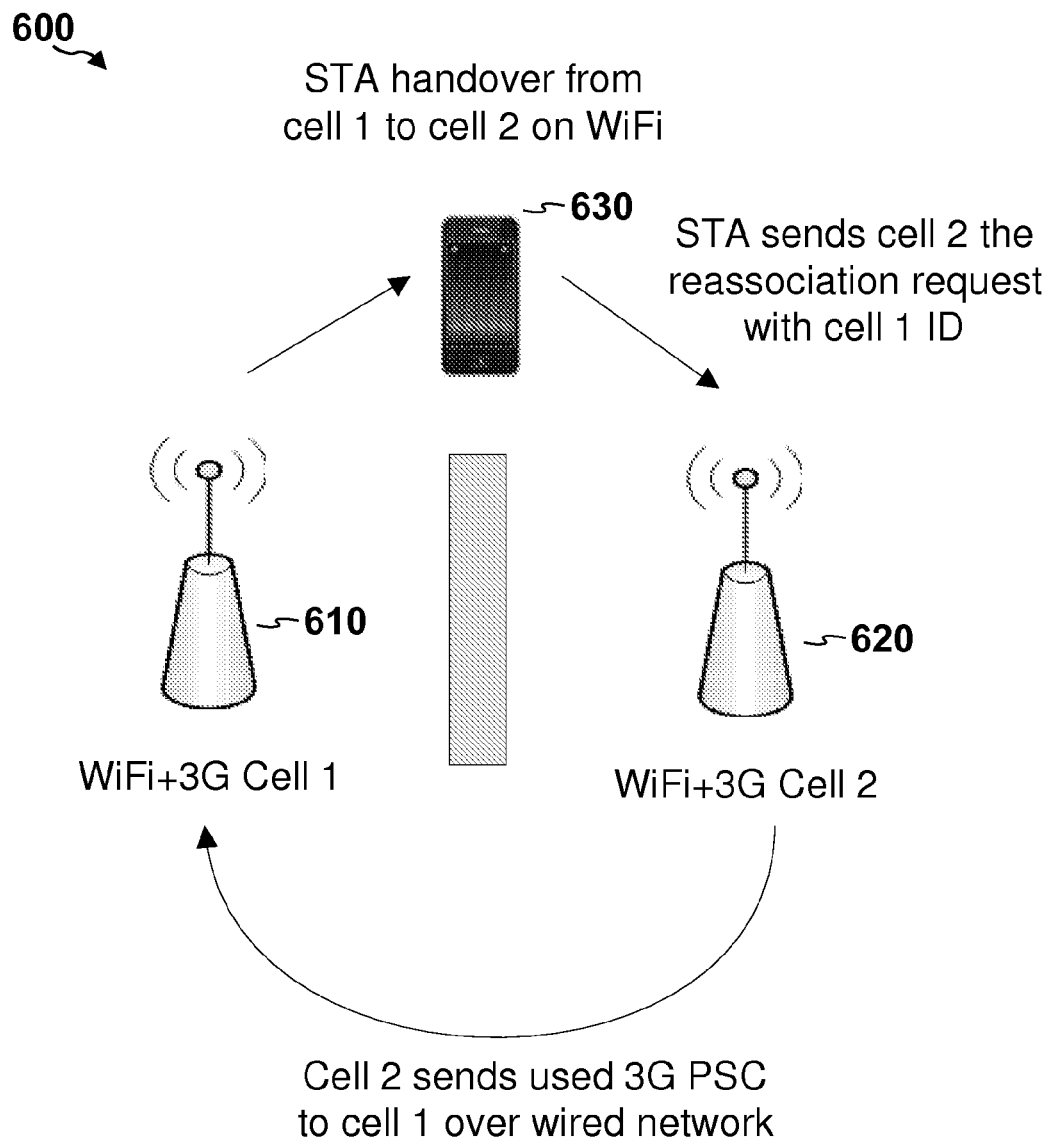
FIG. 6 illustrates aspects of an example system for 3G/4G PSC collision detection.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
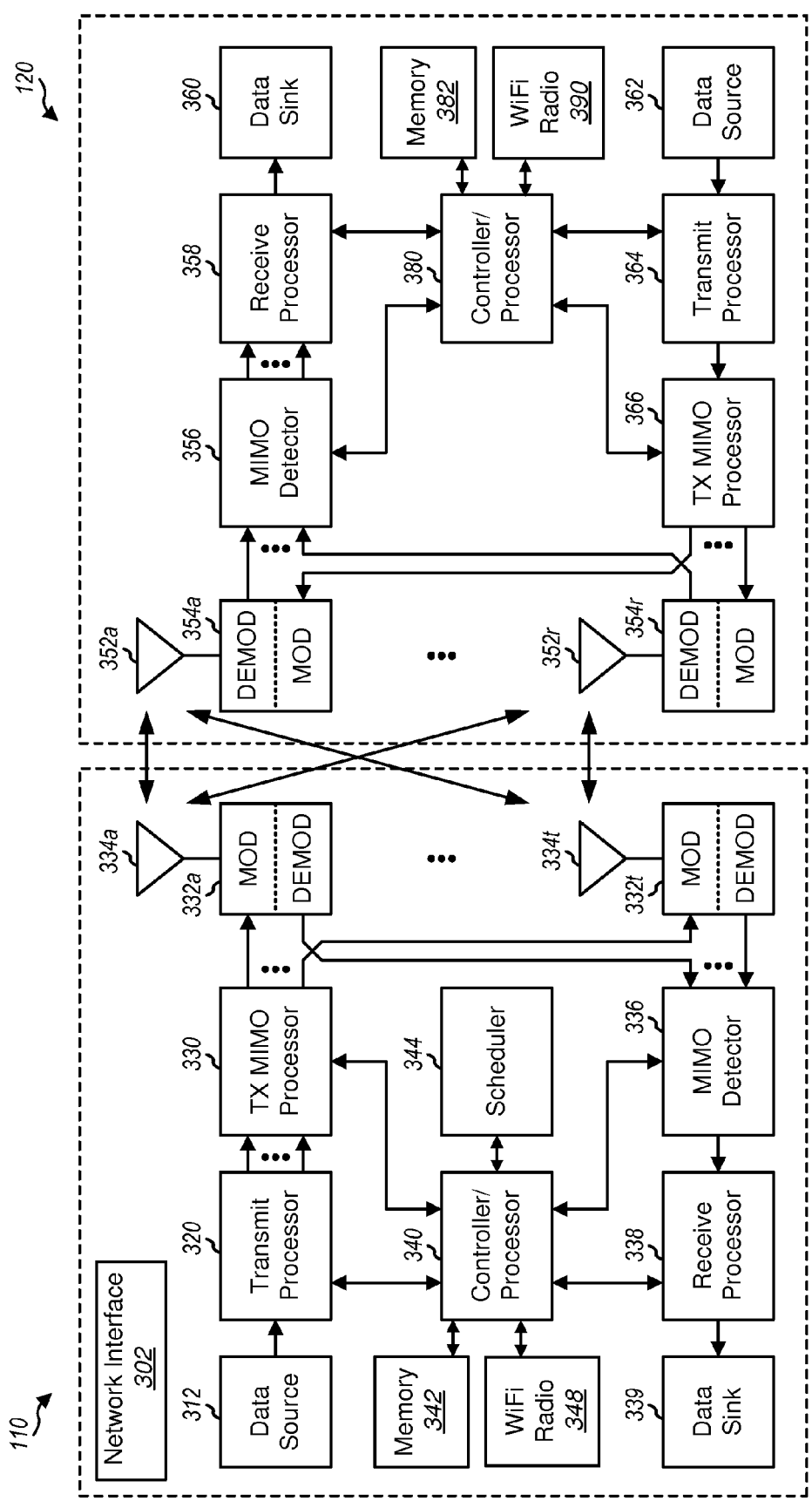
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

In related aspects, the base station 110 may include a radio component 348 (e.g., a WiFi radio component/module or the like) that is co-located with the components 312-344, wherein the base station 110 may use the component 348 to communicate via a first radio technology (e.g., WiFi), and may use ones of the other co-located components to communicate via a second radio technology (e.g., 3G CDMA, 4G LTE, or the like, or combinations thereof). Similarly, the UE 120 may include a radio component 390 (e.g., a WiFi radio component/module or the like) that is co-located with the components 352-382, wherein the UE may use the component 390 to communicate via the first radio technology, and may use ones of the other co-located components to communicate via the second radio technology. In further related aspects, the base station 110 may also include a network interface 302 for connecting to one or more other base stations or core network entities via wired network(s).

Figure 4:
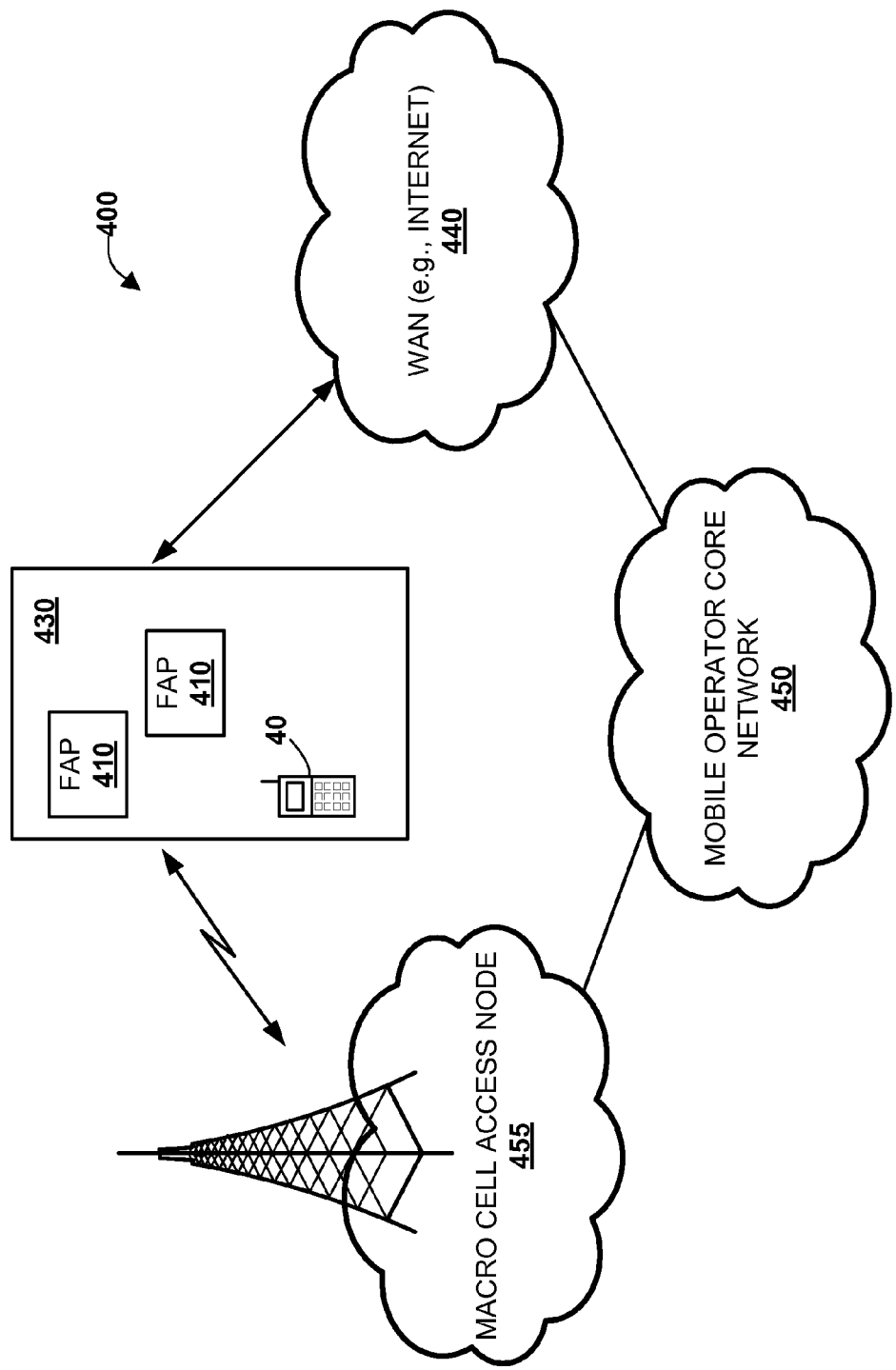
FIG. 4 is a block diagram illustrating another example communication system.

FIG. 4 is an illustration of a planned or semi-planned wireless communication environment 400, in accordance with various aspects. Communication environment 400 includes multiple access point base stations, including FAPs 410, each of which are installed in corresponding small scale network environments. Examples of small scale network environments can include user residences, places of business, indoor/outdoor facilities 430, and so forth. The FAPs 410 can be configured to serve associated UEs 40 (e.g., included in a CSG associated with FAPs 410), or optionally alien or visitor UEs 40 (e.g., UEs that are not configured for the CSG of the FAP 410). Each FAP 410 is further coupled to a wide area network (WAN) (e.g., the Internet 440) and a mobile operator core network 450 via a DSL router, a cable modem, a broadband over power line connection, a satellite Internet connection, or the like.

To implement wireless services via FAPs 410, an owner of the FAPs 410 subscribes to mobile service offered through the mobile operator core network 450. Also, the UE 40 can be capable to operate in a macro cellular environment and/or in a residential small scale network environment, utilizing various techniques described herein. Thus, at least in some disclosed aspects, FAP 410 can be backward compatible with any suitable existing UE 40. Furthermore, in addition to the macro cell mobile network 455, UE 40 is served by a predetermined number of FAPs 410, specifically FAPs 410 that reside within a corresponding user residence(s), place(s) of business, or indoor/outdoor facilities 430, and cannot be in a soft handover state with the macro cell mobile network 455 of the mobile operator core network 450. It should be appreciated that although aspects described herein employ 3GPP terminology, it is to be understood that the aspects can also be applied to various technologies, including 3GPP technology (Release 99 [Rel99], Rel5, Rel6, Rel7), 3GPP2 technology (1×RTT, 1×EV-DO Rel0, RevA, RevB), and other known and related technologies.

As discussed above, an eNB may provide communication coverage for a macro cell, a picocell, a femtocell, and/or other types of cell. Capacity offload gains of a femtocell network are maximized when femtocells are deployed on a dedicated carrier, and thus, there is no interference from a macro network on the same channel as the deployed femtocells. However, because bandwidth is such a scarce resource, bandwidth needs to be allocated and managed with great care and efficiency. Accordingly, an operator may decide if and/or when to dedicate a carrier to femtocells to maximize the capacity of the network.

In accordance with one or more embodiments of the present disclosure, there are provided techniques for detecting physical cell identifier collisions and neighboring cell list construction. In the context of small-coverage base stations or similar network entities, the physical cell identifier (e.g., a primary scrambling code or the like) selected by the small-coverage base station may be the same as that of a neighboring small-coverage base station. In one illustrative example, if 3G small cells are densely deployed in a given area, the primary scrambling code (PSC) selected by a 3G small cell may collide with that of a neighboring small cell. Existing PSC collision detection methods rely on PSC detection in the 3G domain, which cannot guarantee detection, particularly when the PSC collision has already occurred. In addition, each 3G small cell typically constructs its own 3G neighboring cell list, including the used PSC and 3G cell ID of each neighboring cell. Existing construction methods typically rely on PSC detection in the 3G domain, which cannot guarantee detection of each neighboring cell.

The physical cell identifier collision detection and neighboring cell list construction techniques that are proposed herein are based on physical cell identifier information exchange in a given domain (for a first radio technology) that is different from the domain associated with the physical cell identifier itself (for a second radio technology). The proposed techniques assume each small-coverage base station includes co-located modules for the first and second radio technologies.

For illustrative purposes, some of the examples described herein relate to a scenario wherein the network entity is a small-coverage base station (e.g., a FAP) servicing a small cell (e.g., a femotcell), wherein the first radio technology includes WiFi, and wherein the second radio technology includes (a) 3G CDMA and the physical cell identifier comprises a PSC and/or (b) 4G LTE and the physical cell identifier comprises a physical cell identity (PCI). It is noted, however, that the first and second radio technologies are not limited to WiFi, 3G CDMA, or 4G LTE. In another example, the first radio technology may operate in an unlicensed domain and the second radio technology may operative in a licensed domain.

In one example, there is provided a technique for 3G PSC collision detection and neighboring cell list construction methods are based on PSC info exchange in a non-3G domain, such as WiFi or the like. Each small cell in a given area may have a co-located WiFi access point and a 3G Node B, which respectively provide WiFi and 3G services. The PSC and cell ID used by different 3G Node Bs at the neighboring cells may be exchanged in the WiFi domain among different access points via inter-access point air link(s), served WiFi station(s), and/or inter-access point wired network(s). Based on the exchanged PSC info, each cell can know the PSCs used by neighboring cells and hence can detect PSC collision and also construct a neighboring cell list.

One advantage of the above-described technique is that inter-cell interference may be less in the WiFi domain due to more WiFi channels, as well as non-overlapping WiFi transmissions in time. Accordingly, PSC information exchange in the WiFi domain may have a higher success rate, as compared to PSC information exchange in the 3G domain. Another advantage of the above-described technique is that the PSC information exchange in WiFi domain will not be affected by the PSC collision itself which in 3G domain, which would otherwise degrade the detection performance. For example, the physical cell identifier information exchange (e.g., the PSC information exchange) may occur in any non-3G domain, such as via 4G, Bluetooth, or the like. Specific approaches for physical cell identifier collision detection and/or neighboring cell list construction are described in further detail below.

Figure 5:
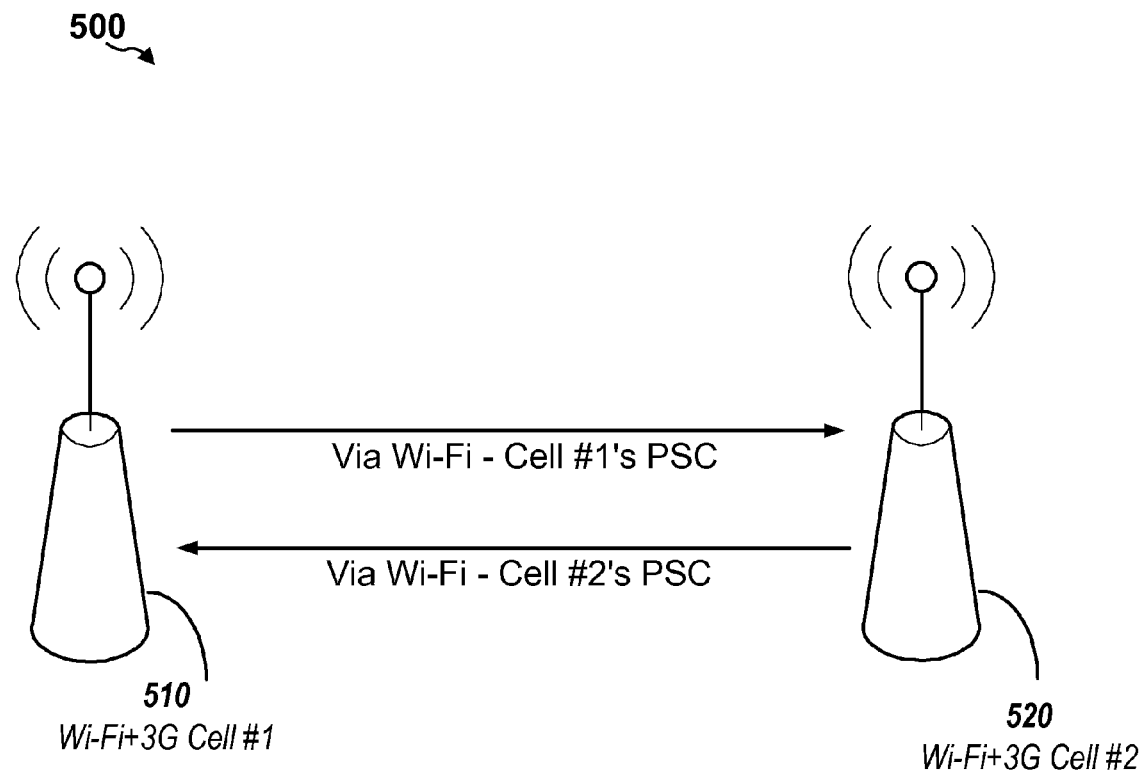
FIG. 5 illustrates aspects of an example system for 3G/4G PSC collision detection.

FIG. 5 illustrates aspects of an example system 500 for 3G/4G PSC collision detection. In an exemplary context where the first radio technology is WiFi and the second radio technology includes 3G CDMA and 4G LTE (referred to herein as 3G/4G), there is provided a first approach for WiFi access point-assisted 3G/4G PSC collision detection. In this example, it is assumed that each cell (510 or 520) includes both a WiFi access point and a 3G/4G Node B, which are co-located and provide WiFi and 3G/4G services, respectively. Such as cell (510 or 520) is referred to as a WiFi+3G/4G cell herein. At each WiFi+3G/4G cell (510 or 520), the WiFi access point may broadcast the PSC used by the co-located 3G/4G Node B. For example, the PSC may be broadcasted in the beacon frames on the serving WiFi channel. The WiFi+3G/4G cell (510 or 520), or components(s) thereof, may be configured to decode the broadcasted PSCs from the neighboring WiFi+3G/4G cells (510 or 520). Each WiFi+3G/4G cell (510 or 520) may decode the PSCs broadcasted by their neighboring WiFi+3G/4G cells (510 or 520). PSC collision may be detected if any neighboring cell (510 or 520) is found to use the same PSC as that of the decoding cell (510 or 520), and the decoding cell (510 or 520) may change its PSC to resolve the collision. In the alternative, or in addition, the decoding cell (510 or 520) may instruct a given neighboring cell (510 or 520) to change its given PSC to resolve the collision.

With reference to FIG. 6, there is illustrated an example system 600 where a first WiFi+3G/4G cell 610 and a second WiFi+3G/4G cell 620 cannot see each other over the air on either WiFi or 3G/4G. In this example, it is assumed that each small cell in a given area is a WiFi+3G/4G cell, and that each WiFi+3G/4G cell can communicate with each other over a wired network. A mobile station/entity 630 served by the cell 610 on WiFi may move toward the cell 620, and may send a reassociation request or the like to the cell 620 to ask for hand-in. The cell 620 may know the WiFi cell ID of the cell 610 from the reassociation request. Based on the cell ID, the cell 620 may send its used PSC or the like to the cell 610 over a wired network, such as, for example, a local area network (LAN), Internet, etc. In related aspects, PSC collision may be detected if the cell 610 finds that the cell 620 uses the same PSC after receiving the sent message. In further related aspects, the cell 610 may change its PSC to resolve the collision. In the alternative, or addition, the cell 610 may instruct the cell 620 to change cell 620's PSC to resolve the collision.

Figure 7A:
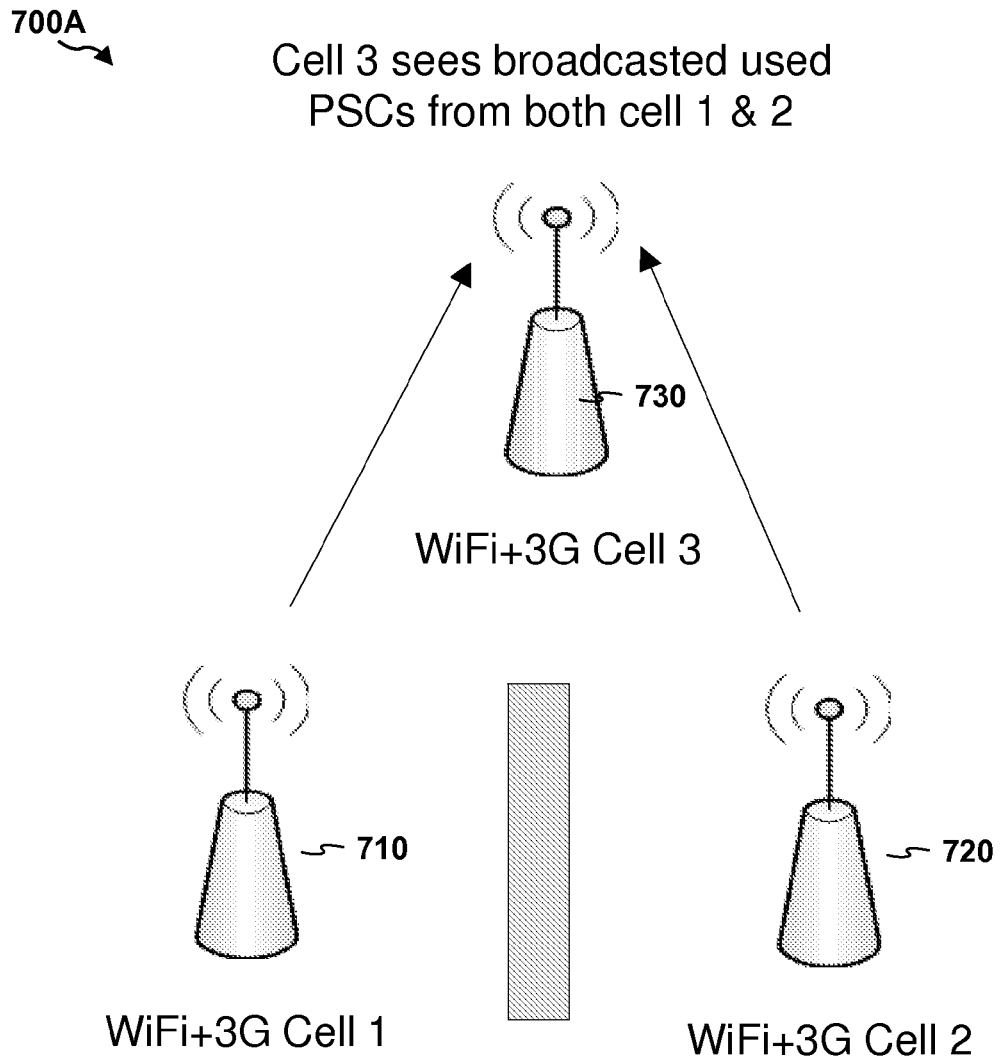
FIG. 7A-B each illustrates aspects of an example system for 3G/4G PSC collision detection.

With reference FIG. 7A, there is illustrated an example system 700A where a first WiFi+3G/4G cell 710 and a second WiFi+3G/4G cell 720 cannot see each other over the air on either WiFi or 3G/4G. In this example, it is assumed that each small cell in a given area is a WiFi+3G/4G. It is further assumed that at each WiFi+3G/4G cell, a WiFi access point broadcasts the PSC used by the co-located 3G/4G Node B, wherein the PSC may optionally be broadcasted in the beacon frames on the serving WiFi channel. It is also assumed that each WiFi+3G/4G cell, or components(s) thereof, may be configured to decode the broadcasted PSCs from the neighboring WiFi+3G/4G cells in the given area. If the same used PSCs are found, a given WiFi+3G/4G cell may inform the neighboring cells either over the air or via a wired network. A third WiFi+3G/4G cell 730 may see both cells 710 and 720 on WiFi or the like. Therefore, the cell 730 may decode the used PSCs broadcasted by the cells 710 and 720 on WiFi or the like. A PSC collision may be detected if the cell 730 finds that the cells 710 and 720 use the same PSC. The cell 730 may instruct the cells 710 and/or 720 to change their PSC(s) either over the air or via a wired network.

Figure 7B:
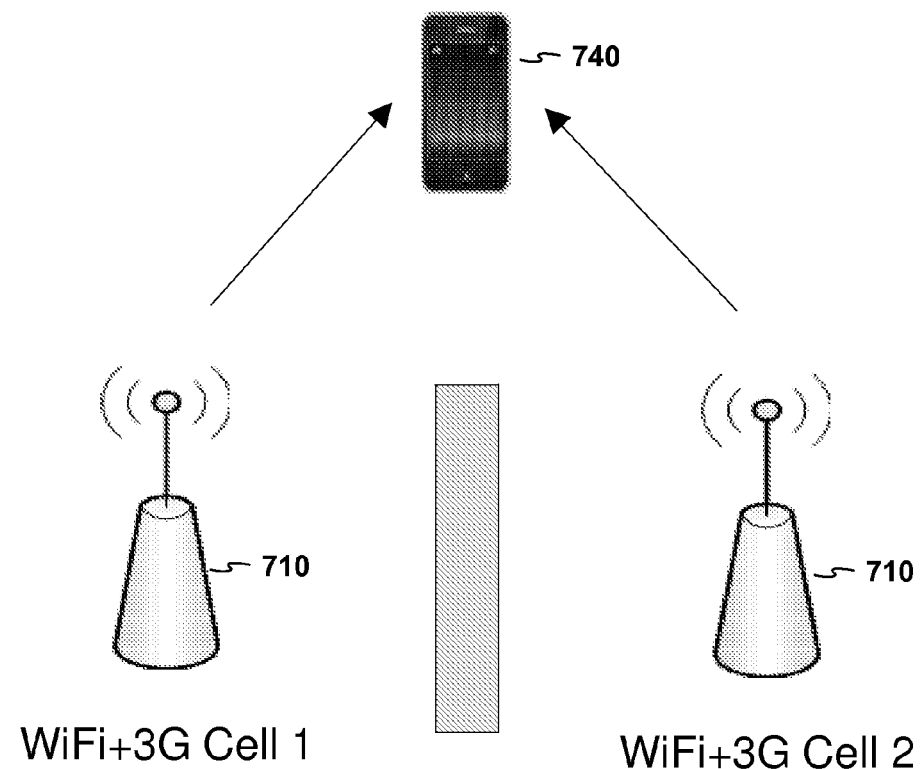

With reference to FIG. 7B, there is illustrated an example system 700B where a first WiFi+3G/4G cell 710 and a second WiFi+3G/4G cell 720 cannot see each other over the air on either WiFi or 3G/4G. In this example, it is assumed that each small cell in a given area is a WiFi+3G/4G, and that, at each WiFi+3G/4G cell, a WiFi access point broadcasts the PSC used by the co-located 3G/4G Node B, wherein the PSC may optionally be broadcasted in the beacon frames on the serving WiFi channel. It is assumed that there is a mobile entity 740 in the given area, wherein the mobile entity 740 or components(s) thereof, may be configured to decode the broadcasted PSCs from the WiFi+3G/4G cells in the given area. If the mobile entity 740 detects that the more than one WiFi+3G/4G cell is using a given PSC, the mobile entity 740 may inform those WiFi+3G/4G cell sharing the given PSC over the air. A mobile entity 740 may see both cells 710 and 720 on WiFi or the like. Thus, the mobile entity 740 may decode the used PSCs broadcasted by the cells 710 and 720 on WiFi or the like. A PSC collision may be detected if the mobile entity 740 finds that the cells 710 and 720 use the same PSC. The mobile entity 740 may instruct the cells 710 and/or 720 to change their PSC(s) either over the air.

Figure 8:
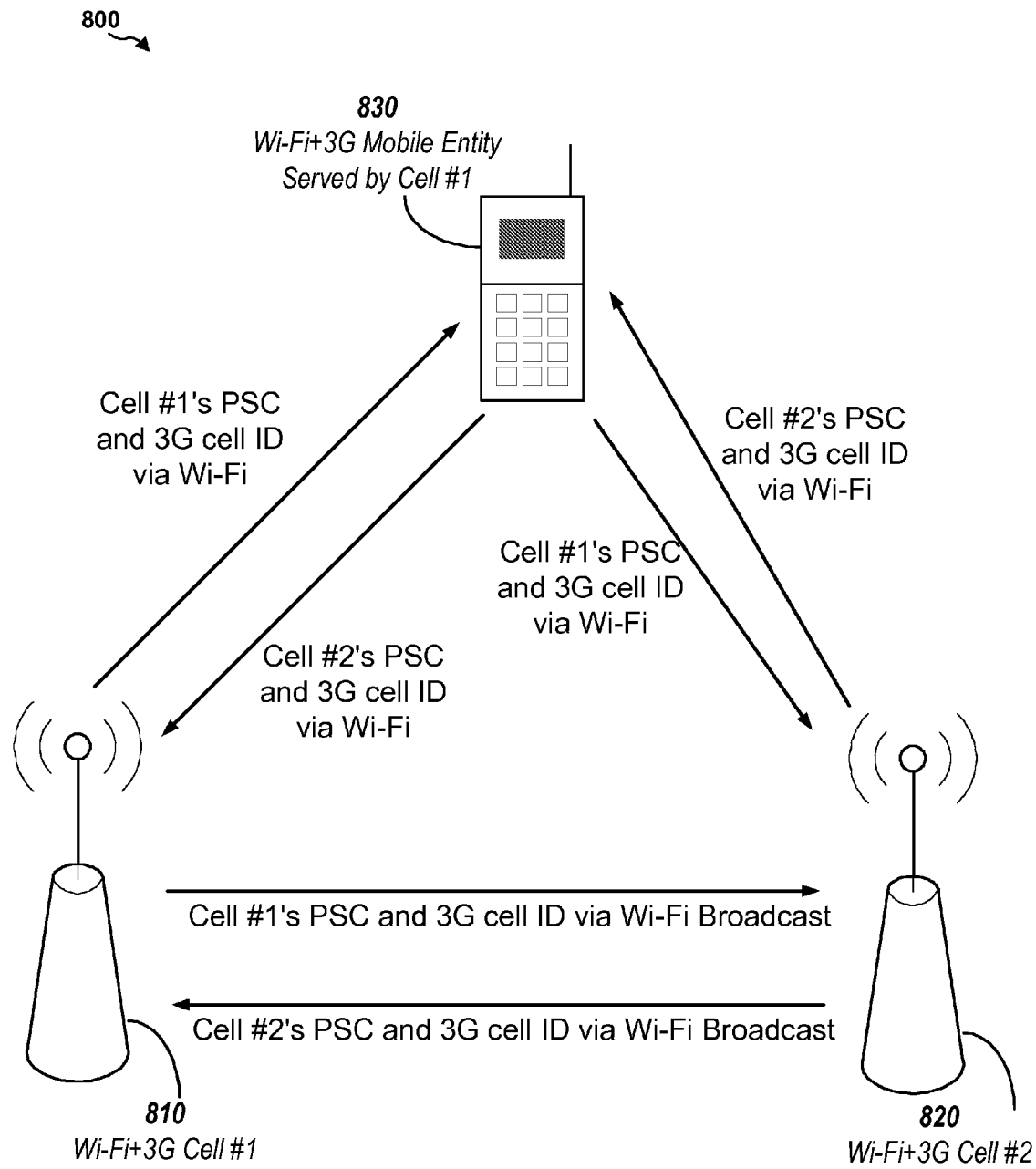
FIG. 8 illustrates aspects of an example system for 3G/4G PSC collision detection.

FIG. 8 illustrates aspects of an additional example system 800 for 3G/4G PSC collision detection. In this example, it is assumed that each small cell in a given area is a WiFi+3G/4G cell, and that, at each WiFi+3G/4G cell (810 or 820), a WiFi access point broadcasts both the PSC and the 3G/4G cell ID used by the co-located 3G/4G Node B, wherein the PSC and the 3G/4G cell ID may optionally be broadcasted in the beacon frames on the serving WiFi channel. Each WiFi+3G/4G cell (810 or 820), or components(s) thereof, may be configured to decode the broadcasted PSCs and the 3G/4G cell IDs from the neighboring WiFi+3G/4G cells (810 or 820). Likewise, a mobile entity 830 in the given area may communicate with at least one WiFi+3G/4G cell (810 or 820) and decode the broadcasted PSC(s) and the 3G/4G cell ID(s) from the at least one WiFi+3G/4G cell (810 or 820). The mobile entity 830 may send the decoded PSC(s) and the 3G/4G cell ID(s) to its serving WiFi+3G/4G cell 810 or other neighboring WiFi+3G/4G cells 820.

In related aspects, each WiFi+3G/4G cell (810 or 820) may decode the PSC(s) and 3G/4G cell ID(s) broadcasted by neighboring WiFi+3G/4G cells (810 or 820) on WiFi. A given WiFi+3G/4G cell (810 or 820) may constructs its 3G/4G neighboring cell list based on the PSC(s) and 3G cell ID(s) decoded by the cell (810 or 820).

In further related aspects, a given mobile station 830 served by a given WiFi+3G/4G cell 810 may decode received PSC(s) and 3G/4G cell ID(s) on WiFi, and may report them to the given serving WiFi+3G/4G cell 810 or to other neighboring WiFi+3G/4G cells 820. Each WiFi+3G/4G cell (810 or 820) may constructs its 3G/4G neighboring cell list based on the PSC(s) and 3G cell ID(s) decoded by itself and/or those reported by the mobile entity 830.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
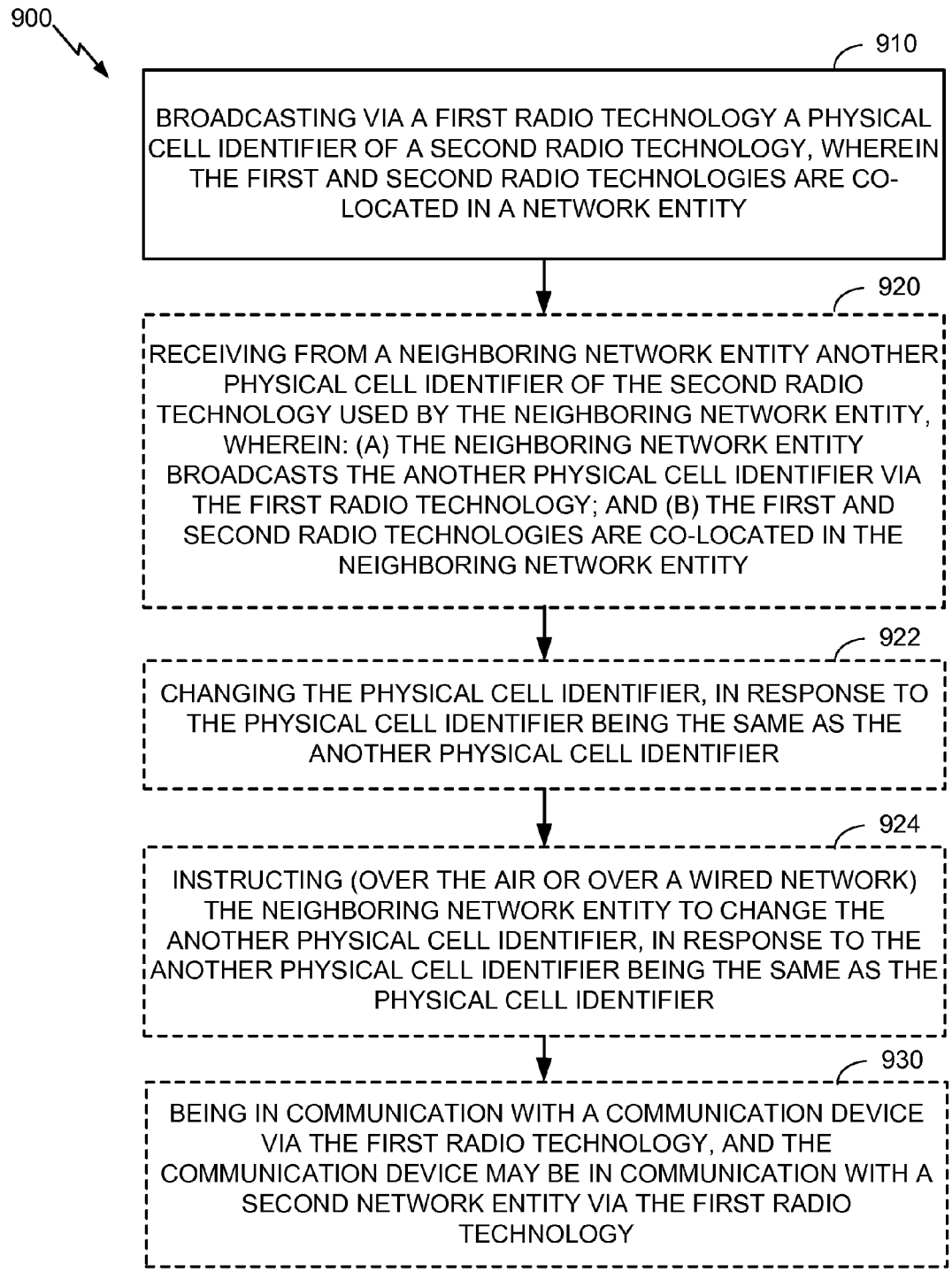
FIG. 9 shows an example methodology for detecting physical cell identifier collisions.

In accordance with one or more aspects of the embodiments described herein, with reference to FIG. 9, there is shown a methodology 900 operable by a network entity, such as, for example, a small-coverage base station for a femtocell, a picocell, or the like. Specifically, method 900 describes a procedure to detect collisions of physical cell identifiers or the like. The method 900 may involve, at 910, broadcasting via a first radio technology a physical cell identifier of a second radio technology, wherein the first and second radio technologies are co-located in a network entity.

With continued reference to FIG. 9, there are also shown further operations or aspects that are optional and may be performed by the network entity or component(s) thereof. The method 900 may terminate after any of the shown blocks without necessarily having to include any subsequent downstream block(s) that may be illustrated. It is further noted that numbers of the blocks do not imply a particular order in which the blocks may be performed according to the method 900. For example, the first radio technology may include WiFi, whereas the second radio technology may include: (a) 3G CDMA and the physical cell identifier comprises a PSC; and (b) 4G LTE and the physical cell identifier comprises a PCI.

In related aspects, the method 900 may further involve receiving from a neighboring network entity another physical cell identifier of the second radio technology used by the neighboring network entity, wherein: (a) the neighboring network entity broadcasts the another physical cell identifier via the first radio technology; and (b) the first and second radio technologies are co-located in the neighboring network entity (block 920). The method 900 may further involve changing the physical cell identifier, in response to the physical cell identifier being the same as the another physical cell identifier (block 922). In the alternative, or in addition, the method 900 may involve instructing (over the air or over a wired network) the neighboring network entity to change the another physical cell identifier, in response to the another physical cell identifier being the same as the physical cell identifier (block 924).

In further related aspects, the network entity may be in communication with a communication device via the first radio technology, and the communication device may be in communication with a second network entity via the first radio technology (block 930). The communication device may be a third network entity or a mobile entity. The second network entity may broadcast via the first radio technology a second physical cell identifier of the second radio technology, wherein the first and second radio technologies may be co-located in the second network entity. The communication device may: (a) receive from the network entity, via the first radio technology, the physical cell identifier of the second radio technology used by the network entity; and (b) receive from the second network entity, via the first radio technology, the second physical cell identifier of the second radio technology used by the second network entity. At least one of the network entity and the second network entity may receive from the communication device an instruction to change its physical cell identifier of the second technology, in response to respective physical cell identifiers being the same for the network entity and the second network entity. The communication device may be a third network entity that sends the instruction over the air or via a wired network.

In accordance with aspects of the embodiments described herein, one or more of blocks 910-930 may be performed by the component(s) of the base station 110 in FIG. 3, wherein the base station 110 may be small-coverage base station that includes a component 348 for communicating via a first radio technology (e.g., WiFi). Co-located with the component 348 may be component(s) 312-344 for communicating via a second radio technology (e.g., 3G/4G). For example, the component 348 (e.g., a WiFi radio), alone or with the controller/processor 340, may broadcast via the first radio technology a physical cell identifier (e.g., a PSC or PCI) of the second radio technology. In related aspects, the computer readable medium or the memory component 342 may be operatively coupled to the other components of the base station 110. For example, the memory component 342 may be adapted to store computer readable instructions and data for executing the processes and functions of the blocks 910-930, the controller/processor 340, the transmit processor 320, the receive processor 338, and/or the like.

Figure 10:
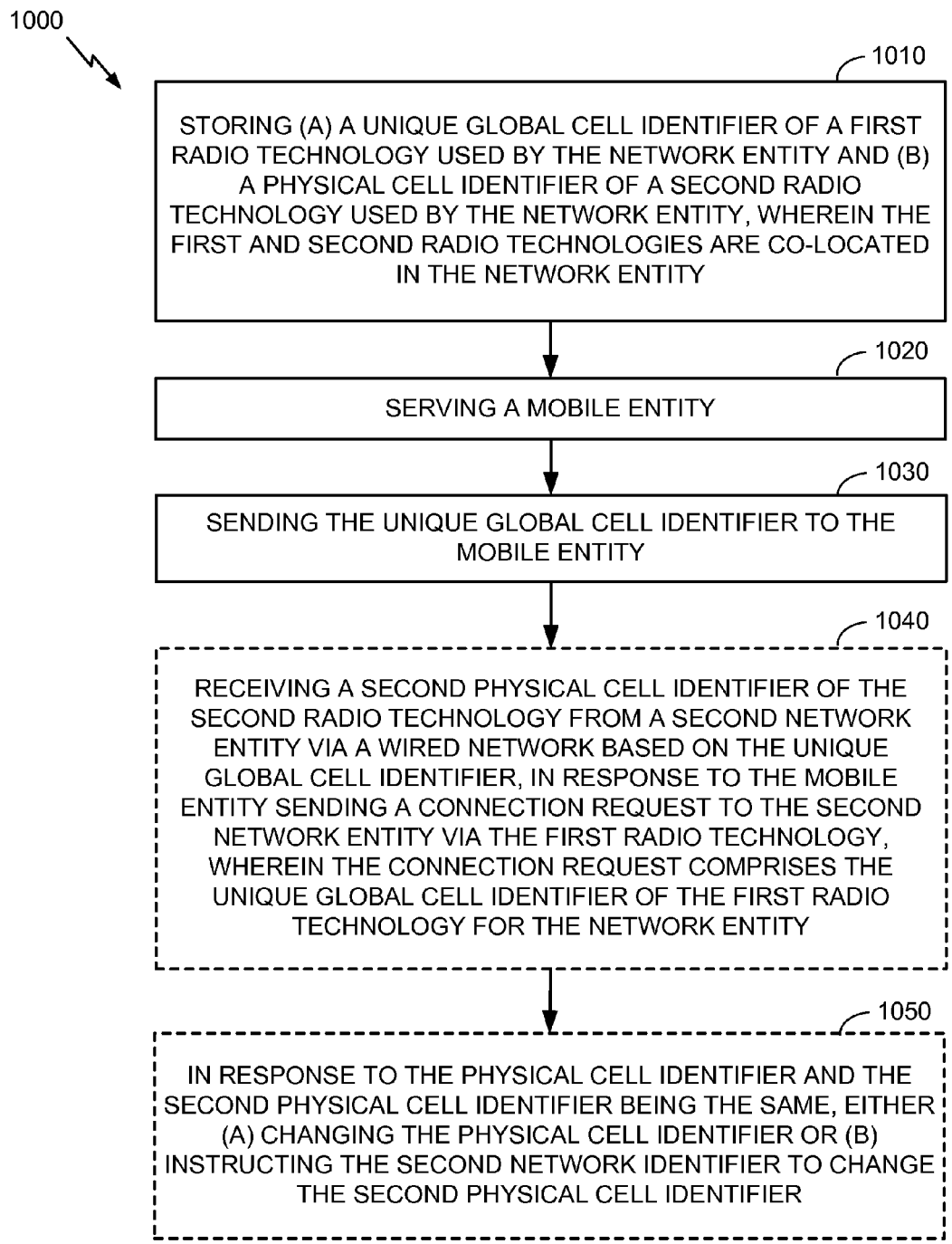
FIG. 10 shows an example methodology for detecting physical cell identifier collisions.

In accordance with one or more aspects of the embodiments described herein, FIG. 10 shows another methodology 1000 for detecting collisions of physical cell identifiers, operable by a network entity. The method 1000 may involve, at 1010, storing (a) a unique global cell identifier of a first radio technology used by the network entity and (b) a physical cell identifier of a second radio technology used by the network entity, wherein the first and second radio technologies are co-located in the network entity. The method 1000 may involve, at 1020, serving a mobile entity and, at 1030, sending the unique global cell identifier to the mobile entity.

The method 1000 may optionally involve receiving a second physical cell identifier of the second radio technology from a second network entity via a wired network based on the unique global cell identifier, in response to the mobile entity sending a connection request to the second network entity via the first radio technology, wherein the connection request comprises the unique global cell identifier of the first radio technology for the network entity (block 1040). The method 1000 may optionally involve, in response to the physical cell identifier and the second physical cell identifier being the same, either (a) changing the physical cell identifier or (b) instructing the second network identifier to change the second physical cell identifier (block 1050).

In accordance with aspects of the embodiments described herein, one or more of blocks 1010-1050 may be performed by the component(s) of the base station 110 in FIG. 3, wherein the base station 110 may be small-coverage base station that includes a component 348 for communicating via a first radio technology. Co-located with the component 348 may be component(s) 312-344 for communicating via a second radio technology. For example, the component 348 and/or the memory 342, may store (a) a unique global cell identifier of the first radio technology used by the base station 110 and (b) a physical cell identifier of the second radio technology used by the base station 110. Component(s) 312-344 and/or 348 may serve a mobile entity and send the unique global cell identifier to the mobile entity. In related aspects, the computer readable medium or the memory component 342 may be operatively coupled to the other components of the base station 110. For example, the memory component 342 may be adapted to store computer readable instructions and data for executing the processes and functions of the blocks 1010-1050, the controller/processor 340, the transmit processor 320, the receive processor 338, and/or the like.

Figure 11:
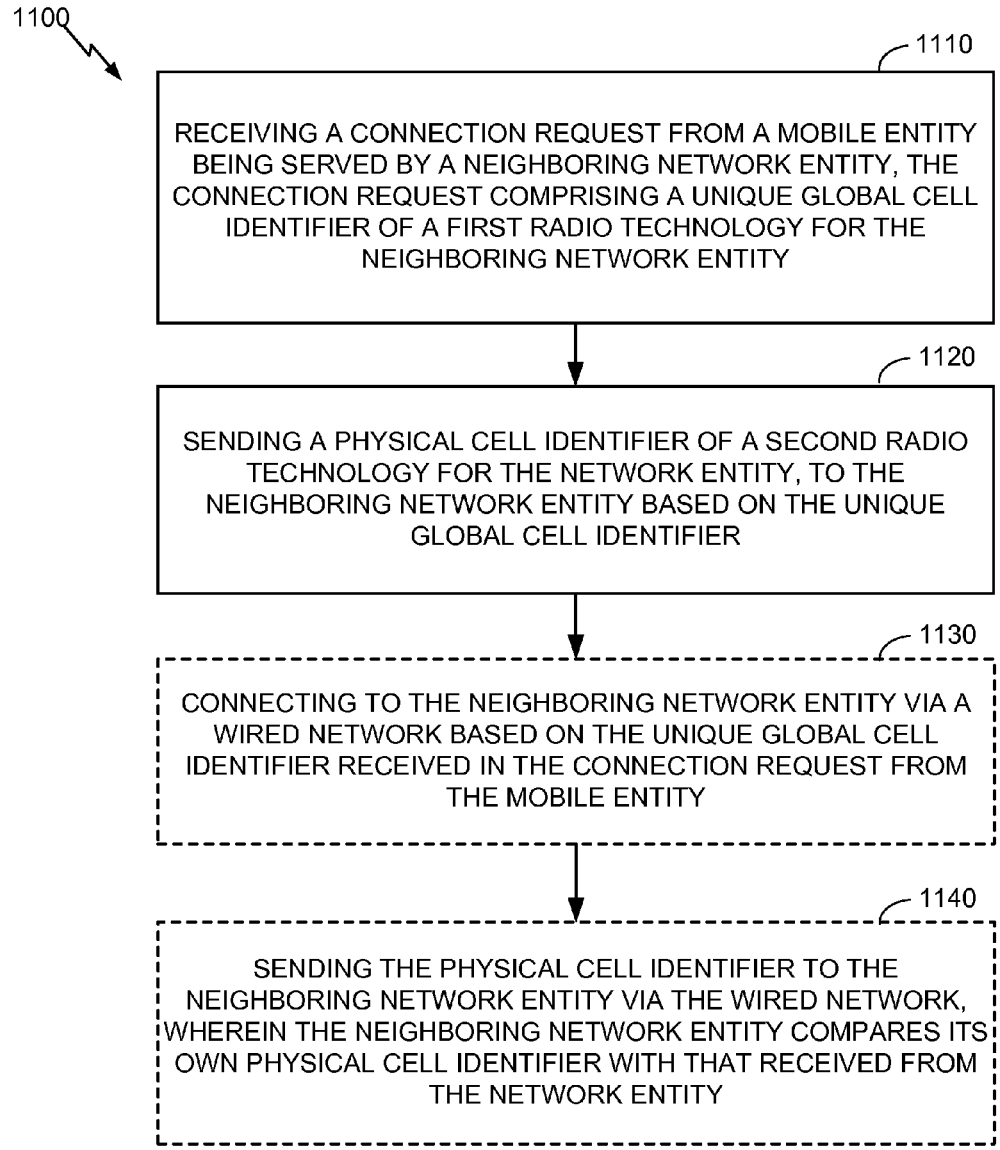
FIG. 11 shows an example methodology for detecting physical cell identifier collisions.

In accordance with one or more aspects of the embodiments described herein, FIG. 11 illustrates yet another physical cell identifier collision detection methodology 1100 operable by a network entity. The method may involve, at 1110, receiving a connection request from a mobile entity being served by a neighboring network entity, the connection request comprising a unique global cell identifier of a first radio technology for the neighboring network entity. The method may involve, at 1120, sending a physical cell identifier of a second radio technology for the network entity, to the neighboring network entity based on the unique global cell identifier.

The method 1110 may optionally involve connecting to the neighboring network entity via a wired network based on the unique global cell identifier received in the connection request from the mobile entity (block 1130). The method 1110 may optionally involve sending the physical cell identifier to the neighboring network entity via the wired network, wherein the neighboring network entity compares its own physical cell identifier with that received from the network entity (block 1140).

In accordance with aspects of the embodiments described herein, one or more of blocks 1110-1140 may be performed by the component(s) of the base station 110 in FIG. 3, wherein the base station 110 may be small-coverage base station that includes a component 348 for communicating via a first radio technology. Co-located with the component 348 may be component(s) 312-344 for communicating via a second radio technology. For example, the receive processor 338, the MIMO detector 336, and/or the component 348 may receive a connection request from a mobile entity being served by a neighboring base station, the connection request comprising a unique global cell identifier of the first radio technology for the neighboring base station. The transmit processor 320, the TX MIMO processor 330, and/or the component 348 may send a physical cell identifier of the second radio technology for the base station 110, to the neighboring base station based on the unique global cell identifier. In related aspects, the computer readable medium or the memory component 342 may be operatively coupled to the other components of the base station 110. For example, the memory component 342 may be adapted to store computer readable instructions and data for executing the processes and functions of the blocks 1110-1140, the controller/processor 340, the transmit processor 320, the receive processor 338, and/or the like.

Figure 12:
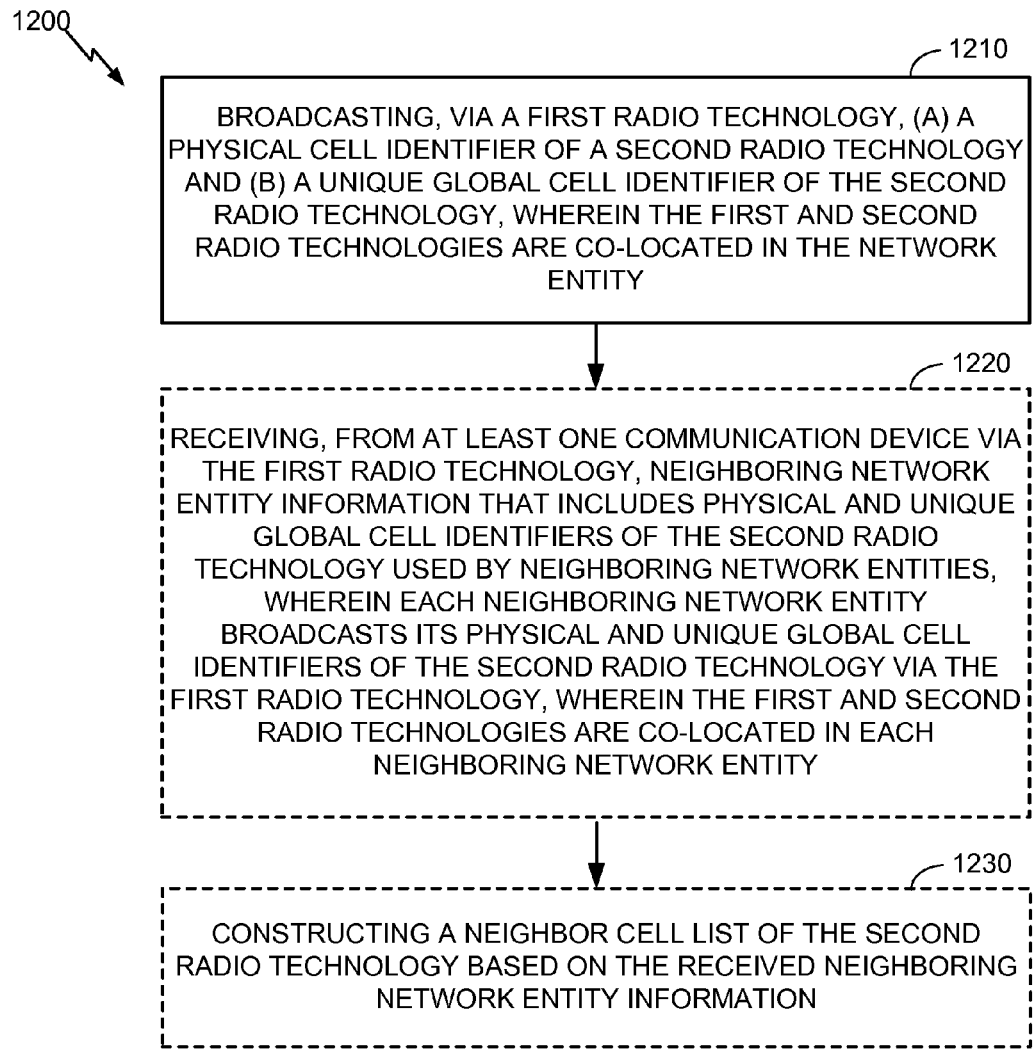
FIG. 12 shows an example methodology for detecting physical cell identifier collisions and constructing a neighboring cell list.

In accordance with one or more aspects of the embodiments described herein, FIG. 12 shows a methodology 1200 for detecting collisions of physical cell identifiers and constructing a neighboring cell list, operable by a network entity. The method 1200 may involve, at 1210, broadcasting, via a first radio technology, (a) a physical cell identifier of a second radio technology and (b) a unique global cell identifier of the second radio technology, wherein the first and second radio technologies are co-located in the network entity.

The method 1200 may optionally involve receiving, from at least one communication device via the first radio technology, neighboring network entity information that includes physical and unique global cell identifiers of the second radio technology used by neighboring network entities, wherein each neighboring network entity broadcasts its physical and unique global cell identifiers of the second radio technology via the first radio technology, wherein the first and second radio technologies are co-located in each neighboring network entity (block 1220).

In related aspects, the communication device may be a second network entity or a mobile entity. The method 1200 may optionally involve constructing a neighbor cell list of the second radio technology based on the received neighboring network entity information (block 1230).

In accordance with aspects of the embodiments described herein, one or more of blocks 1210-1224 may be performed by the component(s) of the base station 110 in FIG. 3, wherein the base station 110 may be small-coverage base station that includes a component 348 for communicating via a first radio technology. Co-located with the component 348 may be component(s) 312-344 for communicating via a second radio technology. For example, the component 348 (e.g., a WiFi radio), alone or with the controller/processor 340, may broadcast, via the first radio technology, (a) a physical cell identifier of the second radio technology and (b) a unique global cell identifier of the second radio technology. In related aspects, the computer readable medium or the memory component 342 may be operatively coupled to the other components of the base station 110. For example, the memory component 342 may be adapted to store computer readable instructions and data for executing the processes and functions of the blocks 1210-1224, the controller/processor 340, the transmit processor 320, the receive processor 338, and/or the like.

Figure 13:
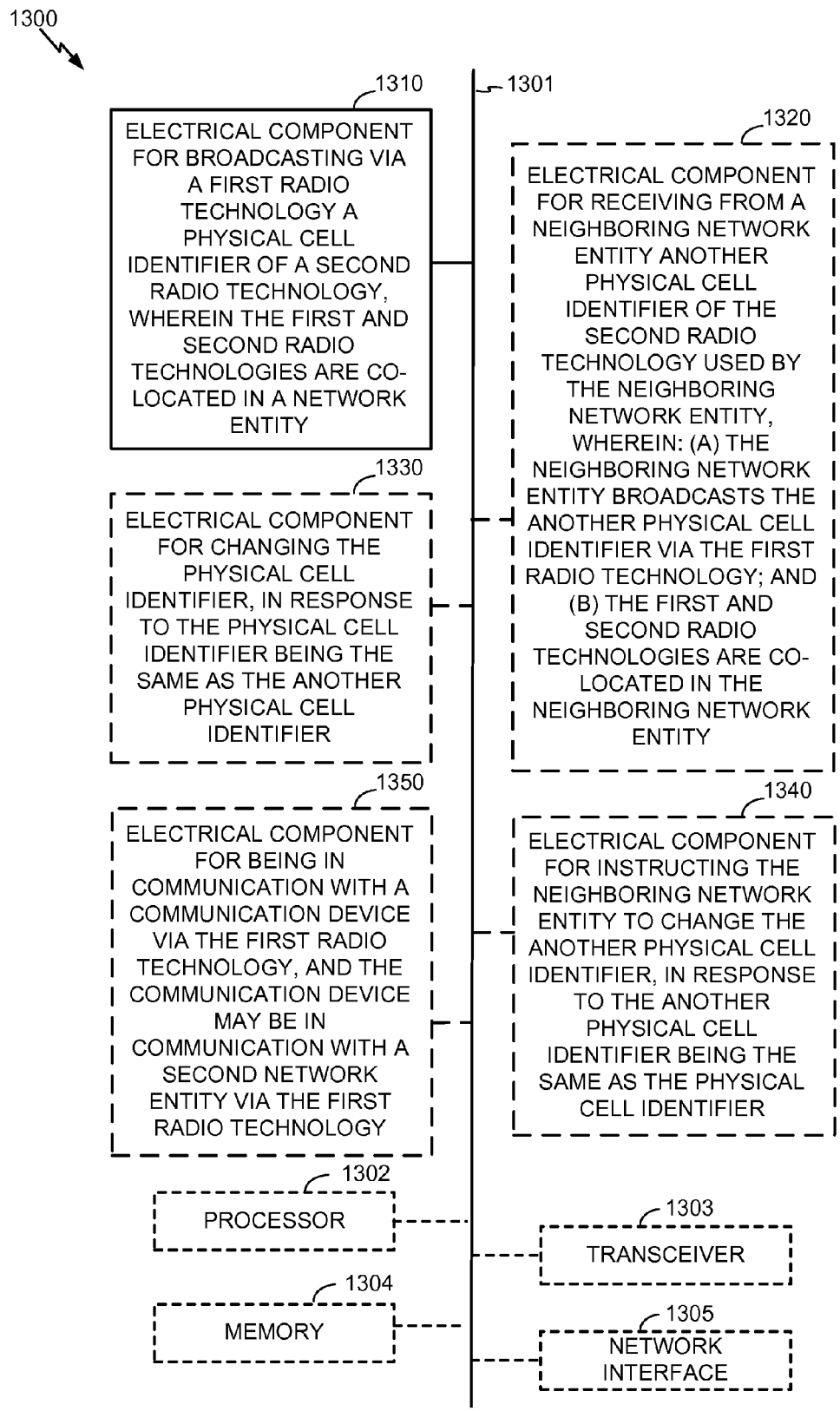
FIG. 13 is a block diagram of an example system for detecting physical cell identifier collisions.

In accordance with one or more aspects of the embodiments described herein, FIG. 13 is a block diagram of an example system for detecting physical cell identifier collisions. The exemplary apparatus 1300 may be configured as a computing device or as a processor or similar device/component for use within. In one example, the apparatus 1300 may include functional blocks that can represent functions implemented by a processor, software, or combination thereof (e.g., firmware). In another example, the apparatus 300 may be a system on a chip (SoC) or similar integrated circuit (IC).

In one embodiment, apparatus 1300 may include an electrical component or module 1310 for broadcasting via a first radio technology a physical cell identifier of a second radio technology, wherein the first and second radio technologies are co-located in a network entity.

The apparatus 1300 may optionally include an electrical component 1320 for receiving from a neighboring network entity another physical cell identifier of the second radio technology used by the neighboring network entity, wherein: (a) the neighboring network entity broadcasts the another physical cell identifier via the first radio technology; and (b) the first and second radio technologies are co-located in the neighboring network entity.

The apparatus 1300 may optionally include an electrical component 1330 for changing the physical cell identifier, in response to the physical cell identifier being the same as the another physical cell identifier.

The apparatus 1300 may optionally include an electrical component 1340 for instructing (over the air or over a wired network) the neighboring network entity to change the another physical cell identifier, in response to the another physical cell identifier being the same as the physical cell identifier.

The apparatus 1300 may optionally include an electrical component 1350 for being in communication with a communication device via the first radio technology, and the communication device may be in communication with a second network entity via the first radio technology.

In further related aspects, the apparatus 1300 may optionally include a processor component 1302. The processor 1302 may be in operative communication with the components 1310-1350 via a bus 1301 or similar communication coupling. The processor 1302 may effect initiation and scheduling of the processes or functions performed by electrical components 1310-1350.

In yet further related aspects, the apparatus 1300 may include a radio transceiver component 1303. A standalone receiver and/or standalone transmitter may be used in lieu of or in conjunction with the transceiver 1303. The apparatus 1300 may also include a network interface 1305 for connecting to one or more other communication devices or the like. The apparatus 1300 may optionally include a component for storing information, such as, for example, a memory device/component 1304. The computer readable medium or the memory component 1304 may be operatively coupled to the other components of the apparatus 1300 via the bus 1301 or the like. The memory component 1304 may be adapted to store computer readable instructions and data for affecting the processes and behavior of the components 1310-1350, and subcomponents thereof, or the processor 1302, or the methods disclosed herein. The memory component 1304 may retain instructions for executing functions associated with the components 1310-1350. While shown as being external to the memory 1304, it is to be understood that the components 1310-1350 can exist within the memory 1304. It is further noted that the components in FIG. 13 may comprise processors, electronic devices, hardware devices, electronic subcomponents, logical circuits, memories, software codes, firmware codes, etc., or any combination thereof.

Figure 14:
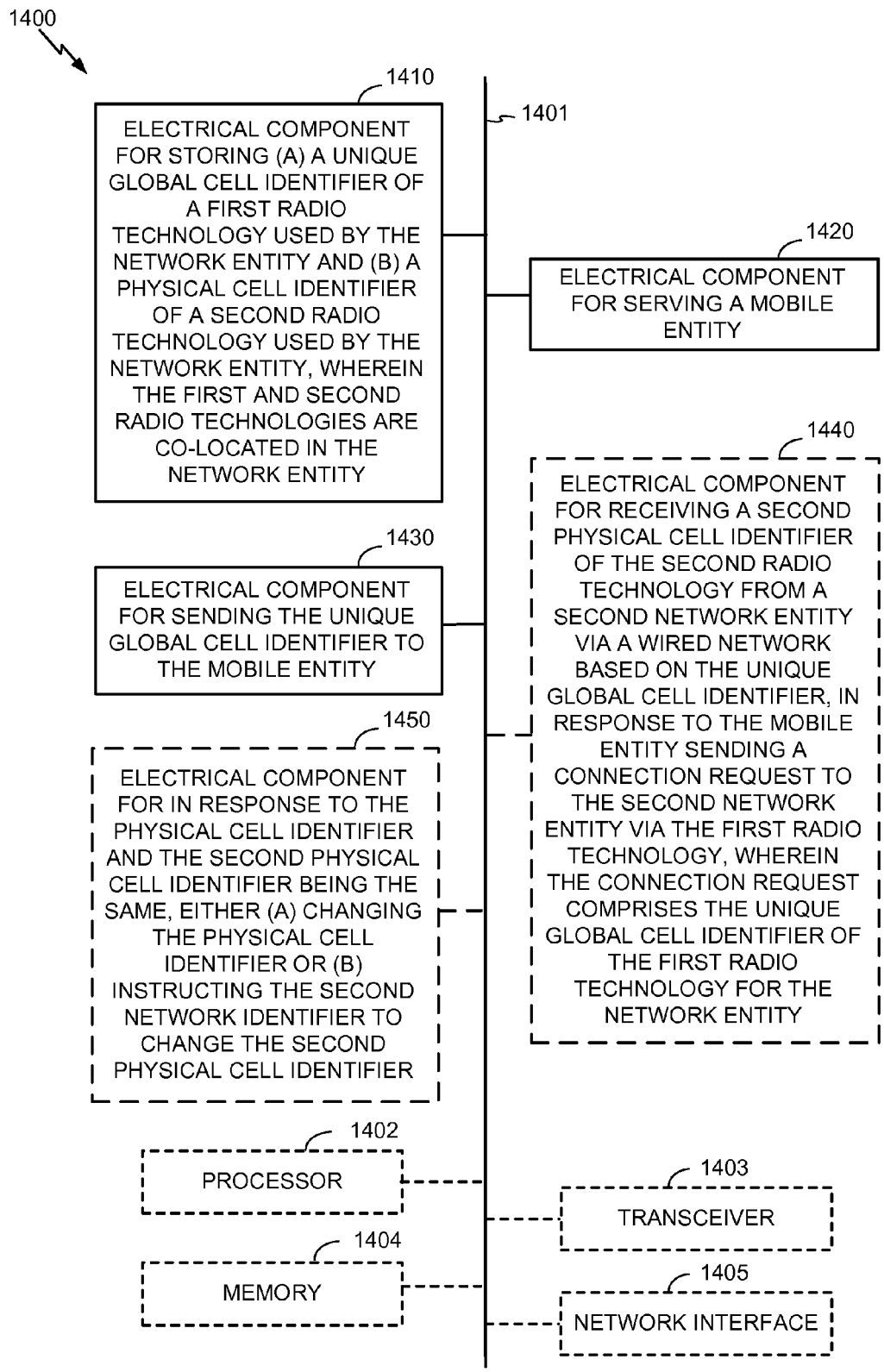
FIG. 14 is another block diagram of an example system for detecting physical cell identifier collisions.

In accordance with one or more aspects of the embodiments described herein, FIG. 14 is a block diagram of an example system for detecting physical cell identifier collisions. The exemplary apparatus 1400 may be configured as a computing device or as a processor or similar device/component for use within. In one example, the apparatus 1400 may include functional blocks that can represent functions implemented by a processor, software, or combination thereof (e.g., firmware). In another example, the apparatus 300 may be a system on a chip (SoC) or similar integrated circuit (IC).

In one embodiment, apparatus 1400 may include an electrical component or module 1410 for storing (a) a unique global cell identifier of a first radio technology used by the network entity and (b) a physical cell identifier of a second radio technology used by the network entity, wherein the first and second radio technologies are co-located in the network entity.

The apparatus 1400 may include an electrical component 1420 for serving a mobile entity.

The apparatus 1400 may optionally include an electrical component 1430 for sending the unique global cell identifier to the mobile entity.

The apparatus 1400 may optionally include an electrical component 1440 for receiving a second physical cell identifier of the second radio technology from a second network entity via a wired network based on the unique global cell identifier, in response to the mobile entity sending a connection request to the second network entity via the first radio technology, wherein the connection request comprises the unique global cell identifier of the first radio technology for the network entity.

The apparatus 1400 may optionally include an electrical component 1450 for in response to the physical cell identifier and the second physical cell identifier being the same, either (a) changing the physical cell identifier or (b) instructing the second network identifier to change the second physical cell identifier.

In further related aspects, the apparatus 1400 may optionally include a processor component 1402. The processor 1402 may be in operative communication with the components 1410-1450 via a bus 1401 or similar communication coupling. The processor 1402 may effect initiation and scheduling of the processes or functions performed by electrical components 1410-1450.

In yet further related aspects, the apparatus 1400 may include a radio transceiver component 1403. A standalone receiver and/or standalone transmitter may be used in lieu of or in conjunction with the transceiver 1403. The apparatus 1400 may also include a network interface 1405 for connecting to one or more other communication devices or the like. The apparatus 1400 may optionally include a component for storing information, such as, for example, a memory device/component 1404. The computer readable medium or the memory component 1404 may be operatively coupled to the other components of the apparatus 1400 via the bus 1401 or the like. The memory component 1404 may be adapted to store computer readable instructions and data for affecting the processes and behavior of the components 1410-1450, and subcomponents thereof, or the processor 1402, or the methods disclosed herein. The memory component 1404 may retain instructions for executing functions associated with the components 1410-1450. While shown as being external to the memory 1404, it is to be understood that the components 1410-1450 can exist within the memory 1404. It is further noted that the components in FIG. 14 may comprise processors, electronic devices, hardware devices, electronic subcomponents, logical circuits, memories, software codes, firmware codes, etc., or any combination thereof.

Figure 15:
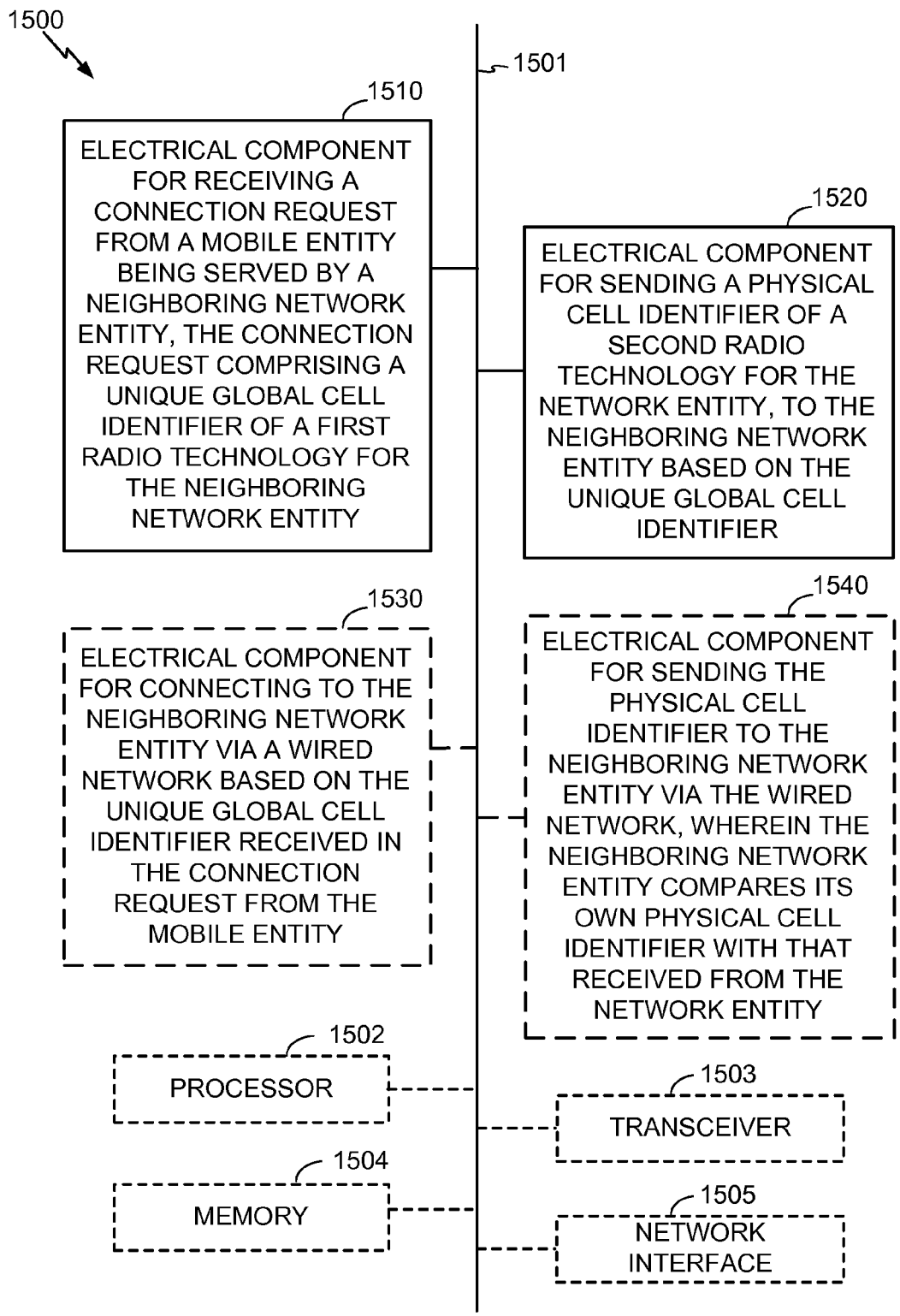
FIG. 15 is yet another block diagram of an example system for detecting physical cell identifier collisions.

In accordance with one or more aspects of the embodiments described herein, FIG. 15 is a block diagram of an example system for detecting physical cell identifier collisions. The exemplary apparatus 1500 may be configured as a computing device or as a processor or similar device/component for use within. In one example, the apparatus 1500 may include functional blocks that can represent functions implemented by a processor, software, or combination thereof (e.g., firmware). In another example, the apparatus 300 may be a system on a chip (SoC) or similar integrated circuit (IC).

In one embodiment, apparatus 1500 may include an electrical component or module 1510 for receiving a connection request from a mobile entity being served by a neighboring network entity, the connection request comprising a unique global cell identifier of a first radio technology for the neighboring network entity.

The apparatus 1500 may include an electrical component 1520 for sending a physical cell identifier of a second radio technology for the network entity, to the neighboring network entity based on the unique global cell identifier.

The apparatus 1500 may optionally include an electrical component 1530 for connecting to the neighboring network entity via a wired network based on the unique global cell identifier received in the connection request from the mobile entity.

The apparatus 1500 may optionally include an electrical component 1540 for sending the physical cell identifier to the neighboring network entity via the wired network, wherein the neighboring network entity compares its own physical cell identifier with that received from the network entity.

In further related aspects, the apparatus 1500 may optionally include a processor component 1502. The processor 1502 may be in operative communication with the components 1510-1540 via a bus 1501 or similar communication coupling. The processor 1502 may effect initiation and scheduling of the processes or functions performed by electrical components 1510-1540.

In yet further related aspects, the apparatus 1500 may include a radio transceiver component 1503. A standalone receiver and/or standalone transmitter may be used in lieu of or in conjunction with the transceiver 1503. The apparatus 1500 may also include a network interface 1505 for connecting to one or more other communication devices or the like. The apparatus 1500 may optionally include a component for storing information, such as, for example, a memory device/component 1504. The computer readable medium or the memory component 1504 may be operatively coupled to the other components of the apparatus 1500 via the bus 1501 or the like. The memory component 1504 may be adapted to store computer readable instructions and data for affecting the processes and behavior of the components 1510-1540, and subcomponents thereof, or the processor 1502, or the methods disclosed herein. The memory component 1504 may retain instructions for executing functions associated with the components 1510-1540. While shown as being external to the memory 1504, it is to be understood that the components 1510-1540 can exist within the memory 1504. It is further noted that the components in FIG. 15 may comprise processors, electronic devices, hardware devices, electronic subcomponents, logical circuits, memories, software codes, firmware codes, etc., or any combination thereof.

Figure 16:
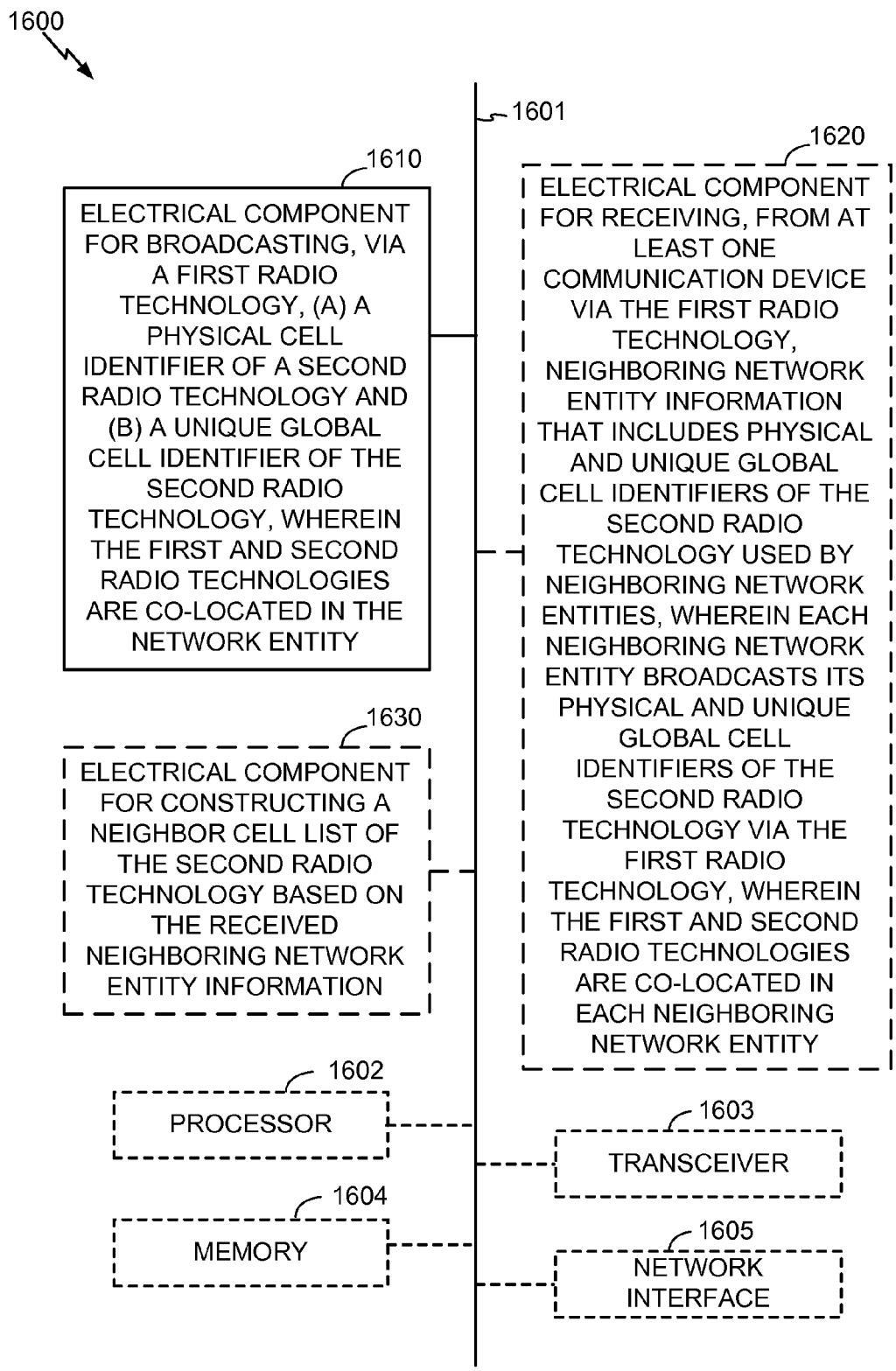
FIG. 16 is still another block diagram of an example system for detecting physical cell identifier collisions.

In accordance with one or more aspects of the embodiments described herein, FIG. 16 is a block diagram of an example system for detecting physical cell identifier collisions. The exemplary apparatus 1600 may be configured as a computing device or as a processor or similar device/component for use within. In one example, the apparatus 1600 may include functional blocks that can represent functions implemented by a processor, software, or combination thereof (e.g., firmware). In another example, the apparatus 300 may be a system on a chip (SoC) or similar integrated circuit (IC).

In one embodiment, apparatus 1600 may include an electrical component or module 1610 for broadcasting, via a first radio technology, (a) a physical cell identifier of a second radio technology and (b) a unique global cell identifier of the second radio technology, wherein the first and second radio technologies are co-located in the network entity.

The apparatus 1600 may optionally include an electrical component 1620 for receiving, from at least one communication device via the first radio technology, neighboring network entity information that includes physical and unique global cell identifiers of the second radio technology used by neighboring network entities, wherein each neighboring network entity broadcasts its physical and unique global cell identifiers of the second radio technology via the first radio technology, wherein the first and second radio technologies are co-located in each neighboring network entity.

The apparatus 1600 may optionally include an electrical component 1630 for constructing a neighbor cell list of the second radio technology based on the received neighboring network entity information.

In further related aspects, the apparatus 1600 may optionally include a processor component 1602. The processor 1602 may be in operative communication with the components 1610-1630 via a bus 1601 or similar communication coupling. The processor 1602 may effect initiation and scheduling of the processes or functions performed by electrical components 1610-1630.

In yet further related aspects, the apparatus 1600 may include a radio transceiver component 1603. A standalone receiver and/or standalone transmitter may be used in lieu of or in conjunction with the transceiver 1603. The apparatus 1600 may also include a network interface 1605 for connecting to one or more other communication devices or the like. The apparatus 1600 may optionally include a component for storing information, such as, for example, a memory device/component 1604. The computer readable medium or the memory component 1604 may be operatively coupled to the other components of the apparatus 1600 via the bus 1601 or the like. The memory component 1604 may be adapted to store computer readable instructions and data for affecting the processes and behavior of the components 1610-1630, and subcomponents thereof, or the processor 1602, or the methods disclosed herein. The memory component 1604 may retain instructions for executing functions associated with the components 1610-1630. While shown as being external to the memory 1604, it is to be understood that the components 1610-1630 can exist within the memory 1604. It is further noted that the components in FIG. 16 may comprise processors, electronic devices, hardware devices, electronic subcomponents, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method operable by a first network entity in a wireless communication network for physical cell identifier collision detection, comprising:
    storing (a) a unique global cell identifier of a first radio technology used by the first network entity and (b) a physical cell identifier of a second radio technology used by the first network entity, wherein the first and second radio technologies are co-located in the first network entity;
    serving a mobile entity;
    sending the unique global cell identifier to the mobile entity;
    receiving, by the first network entity, a second physical cell identifier of the second radio technology used by a second network entity from the second network entity via a wired network based on the unique global cell identifier, in response to the mobile entity sending a connection request to the second network entity via the first radio technology, wherein the connection request comprises the unique global cell identifier of the first radio technology for the first network entity; and
    detecting, by the first network entity, a physical cell identifier collision in response to the physical cell identifier and the second physical cell identifier being the same and either (a) changing the physical cell identifier or (b) instructing the second network entity to change the second physical cell identifier, wherein the detecting the physical cell identifier collision for physical cell identifiers associated with the second radio technology is based on physical cell identifier information exchange in response to the connection request by the mobile entity via the first radio access technology.

2. The method of claim 1, wherein the first network entity and the second network entity are disposed in the wireless communication network such that wireless communication between the first network entity and the second network entity is blocked and wireless detection of the physical cell identifier collision is prevented.

3. An apparatus, comprising:
    means for storing (a) a unique global cell identifier of a first radio technology used by the apparatus and (b) a physical cell identifier of a second radio technology used by the apparatus, wherein the first and second radio technologies are co-located in the apparatus;
    means for serving a mobile entity;
    means for sending the unique global cell identifier to the mobile entity;
    means for receiving, by the apparatus, a second physical cell identifier of the second radio technology used by a second apparatus from the second apparatus via a wired network based on the unique global cell identifier, in response to the mobile entity sending a connection request to the second apparatus via the first radio technology, wherein the connection request comprises the unique global cell identifier of the first radio technology for the apparatus; and
    means for detecting, by the apparatus, a physical cell identifier collision in response to the physical cell identifier and the second physical cell identifier being the same and either (a) changing the physical cell identifier or (b) instructing the second apparatus to change the second physical cell identifier, wherein the detecting the physical cell identifier collision for physical cell identifiers associated with the second radio technology is based on physical cell identifier information exchange in response to the connection request by the mobile entity via the first radio access technology.

4. An apparatus, comprising:
    at least one processor configured to: store (a) a unique global cell identifier of a first radio technology used by the apparatus and (b) a physical cell identifier of a second radio technology used by the apparatus, wherein the first and second radio technologies are co-located in the apparatus; serve a mobile entity; send the unique global cell identifier to the mobile entity; receive, by the apparatus, a second physical cell identifier of the second radio technology used by a second apparatus from the second apparatus via a wired network based on the unique global cell identifier, in response to the mobile entity sending a connection request to the second apparatus via the first radio technology, wherein the connection request comprises the unique global cell identifier of the first radio technology for the apparatus; and detect, by the apparatus, a physical cell identifier collision in response to the physical cell identifier and the second physical cell identifier being the same and either (a) change the physical cell identifier or (b) instruct the second apparatus to change the second physical cell identifier, wherein the detecting the physical cell identifier collision for physical cell identifiers associated with the second radio technology is based on physical cell identifier information exchange in response to the connection request by the mobile entity via the first radio access technology; and
    a memory in operative communication with the at least one processor.

5. A non-transitory computer-readable medium comprising code for causing at least one computer to:
    store (a) a unique global cell identifier of a first radio technology used by a first network entity and (b) a physical cell identifier of a second radio technology used by the first network entity, wherein the first and second radio technologies are co-located in the first network entity;
    serve a mobile entity;
    send the unique global cell identifier to the mobile entity;
    receive, by the first network entity, a second physical cell identifier of the second radio technology used by a second network entity from the second network entity via a wired network based on the unique global cell identifier, in response to the mobile entity sending a connection request to the second network entity via the first radio technology, wherein the connection request comprises the unique global cell identifier of the first radio technology for the first network entity; and detect, by the first network entity, a physical cell identifier collision in response to the physical cell identifier and the second physical cell identifier being the same and either (a) change the physical cell identifier or (b) instruct the second network entity to change the second physical cell identifier, wherein the detecting the physical cell identifier collision for physical cell identifiers associated with the second radio technology is based on physical cell identifier information exchange in response to the connection request by the mobile entity via the first radio access technology.

6. A method operable by a network entity in a wireless communication network for physical cell identifier collision detection, comprising:

receiving, by the network entity, a connection request from a mobile entity being served by a neighboring network entity, the connection request comprising a unique global cell identifier of a first radio technology for the neighboring network entity;

connecting to the neighboring network entity via a wired network based on the unique global cell identifier received in the connection request from the mobile entity; and sending a physical cell identifier of a second radio technology for the network entity, to the neighboring network entity via the wired network based on the unique global cell identifier, wherein the neighboring network entity compares its own physical cell identifier with that received from the network entity to detect a physical cell identifier collision in response to the physical cell identifier and the second physical cell identifier being the same and either (a) changing the neighboring network entity physical cell identifier or (b) instructing the network entity to change the physical cell identifier for the network entity, wherein the detecting the physical cell identifier collision for physical cell identifiers associated with the second radio technology is based on physical cell identifier information exchange in response to the connection request by the mobile entity via the first radio access technology.

7. The method of claim 6, wherein:

the network entity comprises a small-coverage base station;

the first radio technology comprises WiFi with the unique global cell identifier as an access point mac address; and a second radio technology comprises at least one of:

3G CDMA with the physical cell identifier as a primary scrambling code (PSC); or 4G LTE with the physical cell identifier as physical cell identity (PCI).

8. The method of claim 6, wherein the network entity and the neighboring network entity are disposed in the wireless communication network such that wireless communication between the network entity and the neighboring network entity is blocked and wireless detection of the physical cell identifier collision is prevented.

9. An apparatus, comprising:

means for receiving, by the apparatus, a connection request from a mobile entity being served by a neighboring network entity, the connection request comprising a unique global cell identifier of a first radio technology for the neighboring network entity;

means for connecting to the neighboring network entity via a wired network based on the unique global cell identifier received in the connection request from the mobile entity; and means for sending a physical cell identifier of a second radio technology for the apparatus, to the neighboring network entity via the wired network based on the unique global cell identifier, wherein the neighboring network entity compares its own physical cell identifier with that received from the network entity to detect a physical cell identifier collision in response to the physical cell identifier and the second physical cell identifier being the same and either (a) changing the neighboring network entity physical cell identifier or (b) instructing the network entity to change the physical cell identifier for the network entity, wherein the detecting the physical cell identifier collision for physical cell identifiers associated with the second radio technology is based on physical cell identifier information exchange in response to the connection request by the mobile entity via the first radio access technology.

10. An apparatus, comprising:

at least one processor configured to: receive, by the apparatus, a connection request from a mobile entity being served by a neighboring network entity, the connection request comprising a unique global cell identifier of a first radio technology for the neighboring network entity; connect to the neighboring network entity via a wired network based on the unique global cell identifier received in the connection request from the mobile entity, and send a physical cell identifier of a second radio technology for the apparatus, to the neighboring network entity via the wired network based on the unique global cell identifier, wherein the neighboring network entity compares its own physical cell identifier with that received from the network entity to detect a physical cell identifier collision in response to the physical cell identifier and the second physical cell identifier being the same and either (a) change the neighboring network entity physical cell identifier or (b) instruct the network entity to change the physical cell identifier for the network entity, wherein the detecting the physical cell identifier collision for physical cell identifiers associated with the second radio technology is based on physical cell identifier information exchange in response to the connection request by the mobile entity via the first radio access technology; and a memory in operative communication with the at least one processor.

11. A non-transitory computer-readable medium comprising code for causing at least one computer to:

receive, by a network entity, a connection request from a mobile entity being served by a neighboring network entity, the connection request comprising a unique global cell identifier of a first radio technology for the neighboring network entity;

connect to the neighboring network entity via a wired network based on the unique global cell identifier received in the connection request from the mobile entity; and send a physical cell identifier of a second radio technology for the network entity, to the neighboring network entity via the wired network based on the unique global cell identifier, wherein the neighboring network entity compares its own physical cell identifier with that received from the network entity to detect a physical cell identifier collision in response to the physical cell identifier and the second physical cell identifier being the same and either (a) change the neighboring network entity physical cell identifier or (b) instruct the network entity to change the physical cell identifier for the network entity, wherein the detecting the physical cell identifier collision for physical cell identifiers associated with the second radio technology is based on physical cell identifier information exchange in response to the connection request by the mobile entity via the first radio access technology.

12. A method operable by a network entity in a wireless communication network for physical cell identifier collision detection, comprising:
broadcasting, via a first radio technology, (a) a physical cell identifier of a second radio technology used by the network entity in the second radio technology and (b) a unique global cell identifier of the second radio technology used by the network entity in the second radio technology, wherein the first and second radio technologies are co-located in the network entity;
serving a mobile entity;
receiving, from the mobile entity via the first radio technology, neighboring network entity information that includes physical and unique global cell identifiers of the second radio technology used by at least one neighboring network entities, wherein each neighboring network entity of the at least one neighboring network entities broadcasts its physical and unique global cell identifiers of the second radio technology via the first radio technology, wherein the first and second radio technologies are co-located in each neighboring network entity of the at least one neighboring network entities; and
detecting, by the first network entity, a physical cell identifier collision in response to the physical cell identifier and a physical cell identifier of the neighboring network entity physical cell identifiers being the same and either (a) changing the physical cell identifier or (b) instructing a respective neighboring network entity of the at least one neighboring network entities to change the second physical cell identifier.

13. The method of claim 12, wherein:
the network entity comprises a small-coverage base station;
the first radio technology comprises WiFi; and
the second radio technology comprises at least one of:
3G CDMA and the physical cell identifier comprises a primary scrambling code (PSC); and
4G LTE and the physical cell identifier comprises a physical cell identity (PCI).

14. The method of claim 12, wherein the first network entity and the at least one neighboring network entities are disposed in the wireless communication network such that wireless communication between the first network entity and the at least one neighboring network entities is blocked and wireless detection of the physical cell identifier collision is prevented.

15. The method of claim 12, further comprising constructing a neighbor cell list of the second radio technology based on the received neighboring network entity information.

16. An apparatus, comprising:
means for storing (a) a physical cell identifier of a second radio technology used by the apparatus in the second radio technology and (b) a unique global cell identifier of the second radio technology used by the apparatus in the second radio technology; and
means for broadcasting, via a first radio technology, (a) the physical cell identifier of a second radio technology used by the apparatus in the second radio technology and (b) the unique global cell identifier of the second radio technology used by the apparatus in the second radio technology, wherein the first and second radio technologies are co-located in the apparatus;
means for serving a mobile entity;
means for receiving, from the mobile entity via the first radio technology, neighboring network entity information that includes physical and unique global cell identifiers of the second radio technology used by at least one neighboring network entities, wherein each neighboring network entity of the at least one neighboring network entities broadcasts its physical and unique global cell identifiers of the second radio technology via the first radio technology, wherein the first and second radio technologies are co-located in each neighboring network entity of the at least one neighboring network entities; and
means for detecting, by the first network entity, a physical cell identifier collision in response to the physical cell identifier and a physical cell identifier of the neighboring network entity physical cell identifiers being the same and either (a) changing the physical cell identifier or (b) instructing a respective neighboring network entity of the at least one neighboring network entities to change the second physical cell identifier.

17. An apparatus, comprising:
at least one processor configured to: broadcast, via a first radio technology, (a) a physical cell identifier of a second radio technology used by the apparatus in the second radio technology and (b) a unique global cell identifier of the second radio technology used by the apparatus in the second radio technology, wherein the first and second radio technologies are co-located in the apparatus; serve a mobile entity; receive, from the mobile entity via the first radio technology, neighboring network entity information that includes physical and unique global cell identifiers of the second radio technology used by at least one neighboring network entities, wherein each neighboring network entity of the at least one neighboring network entities broadcasts its physical and unique global cell identifiers of the second radio technology via the first radio technology, wherein the first and second radio technologies are co-located in each neighboring network entity of the at least one neighboring network entities; and detect, by the first network entity, a physical cell identifier collision in response to the physical cell identifier and a physical cell identifier of the neighboring network entity physical cell identifiers being the same and either (a) change the physical cell identifier or (b) instruct a respective neighboring network entity of the at least one neighboring network entities to change the second physical cell identifier; and
a memory in operative communication with the at least one processor.

18. A non-transitory computer-readable medium comprising code for causing at least one computer to:
broadcast, by a network entity via a first radio technology, (a) a physical cell identifier of a second radio technology used by the network entity in the second radio technology and (b) a unique global cell identifier of the second radio technology used by the network entity in the second radio technology, wherein the first and second radio technologies are co-located in a network entity;

serve a mobile entity;

receive, from the mobile entity via the first radio technology, neighboring network entity information that includes physical and unique global cell identifiers of the second radio technology used by at least one neighboring network entities, wherein each neighboring network entity of the at least one neighboring network entities broadcasts its physical and unique global cell identifiers of the second radio technology via the first radio technology, wherein the first and second radio technologies are co-located in each neighboring network entity of the at least one neighboring network entities; and detect, by the first network entity, a physical cell identifier collision in response to the physical cell identifier and a physical cell identifier of the neighboring network entity physical cell identifiers being the same and either (a) change the physical cell identifier or (b) instruct a respective neighboring network entity of the at least one neighboring network entities to change the second physical cell identifier.

\* \* \* \* \*